United States Patent
Yasuda

(10) Patent No.: US 8,717,871 B2
(45) Date of Patent: May 6, 2014

(54) PACKET RETRANSMISSION CONTROL SYSTEM, METHOD AND PROGRAM

(75) Inventor: Masato Yasuda, Tokyo (JP)

(73) Assignee: NEC Corporation, Tokyo (JP)

(*) Notice: Subject to any disclaimer, the term of this patent is extended or adjusted under 35 U.S.C. 154(b) by 121 days.

(21) Appl. No.: 13/198,622

(22) Filed: Aug. 4, 2011

(65) Prior Publication Data

US 2011/0286469 A1    Nov. 24, 2011

Related U.S. Application Data

(63) Continuation of application No. PCT/JP2011/054472, filed on Feb. 28, 2011.

(30) Foreign Application Priority Data

Mar. 3, 2010   (JP) .................................. 2010-046418

(51) Int. Cl.
| | | |
|---|---|---|
| G06F 11/00 | (2006.01) | |
| H04J 3/14 | (2006.01) | |
| H04L 12/66 | (2006.01) | |
| H04J 3/16 | (2006.01) | |
| G06F 15/16 | (2006.01) | |
| G06F 15/173 | (2006.01) | |
| H04L 1/18 | (2006.01) | |

(52) U.S. Cl.
USPC ........... 370/216; 370/252; 370/394; 370/469; 709/230; 709/238; 714/749

(58) Field of Classification Search
USPC .......... 370/389, 252, 216, 394, 469; 709/230, 709/238; 714/749
See application file for complete search history.

(56) References Cited

U.S. PATENT DOCUMENTS 7,380,014 B2 * 5/2008 LeCroy et al. ................ 709/231
7,417,956 B2 * 8/2008 Nakazawa .................... 370/252

(Continued)

FOREIGN PATENT DOCUMENTS

JP       2009-055419 A    3/2009
WO     WO2005/051126 A1  6/2005

(Continued)

OTHER PUBLICATIONS

Toru Takamichi et al. "Ultra-High Speed MAC Technology for Terabit-Class LAN" Proceedings of The Institute of Electronics, Information and Communication Engineers Communications Society Conference, 2008.

(Continued)

*Primary Examiner* — Alpus H Hsu
*Assistant Examiner* — Anthony Luo
(74) *Attorney, Agent, or Firm* — McGinn IP Law Group, PLLC

(57) ABSTRACT

A lower layer retransmission control unit performs the following processing. When transmitting a transmission packet, giving a sequence number indicating a transmission order to the transmission packet. Receiving, from a receiving device that receives the transmission packet as a reception packet, an ACK packet indicating the sequence number of the reception packet. Referring to the sequence number of the received ACK packet to determine whether or not the ACK packet is received in an order of the sequence number. Transmitting first to third transmission packets and, if receiving a first ACK packet and receiving a third ACK packet following the first ACK packet without receiving a second ACK packet, performing fast retransmission control processing. Specifically, determining whether or not to receive the second ACK packet before a fast retransmission determination period passes after a reception time of the third ACK packet. If failing to receive the second ACK packet within the fast retransmission determination period, retransmitting the second transmission packet.

7 Claims, 19 Drawing Sheets

(56) References Cited

U.S. PATENT DOCUMENTS

| | | |
|---|---|---|
| 2006/0256803 A1 | 11/2006 | Nakata et al. |
| 2007/0068888 A1 | 3/2007 | Tombu et al. |
| 2009/0059928 A1 | 3/2009 | Enomoto et al. |
| 2009/0268747 A1* | 10/2009 | Kurata et al. ............ 370/412 |
| 2009/0303871 A1* | 12/2009 | Kim et al. ............ 370/216 |
| 2009/0316579 A1* | 12/2009 | Tang ............ 370/231 |
| 2011/0125915 A1* | 5/2011 | Takei et al. ............ 709/230 |

FOREIGN PATENT DOCUMENTS

| | | |
|---|---|---|
| WO | WO2005/067261 A1 | 7/2005 |
| WO | WO2008/051126 A1 | 5/2008 |

OTHER PUBLICATIONS

Written Opinion of the ISA dated May 31, 2001 (and English Translation thereof).

* cited by examiner

Fig. 7

41:TRANSMISSION PACKET INFORMATION

| SEQUENCE NUMBER | DESTINATION | TRANSMISSION TIME | DIFFERENCE Δ | DATA MAIN BODY |
|---|---|---|---|---|
| | | | | |
| | | | | |
| | | | | |
| | | | | |

Fig. 11

42:FAST RETRANSMISSION CONTROL INFORMATION

| REFERENCE ACK PACKET INFORMATION | | RTT RANGE INFORMATION | |
|---|---|---|---|
| SEQUENCE NUMBER | ARRIVAL TIME | RTTmax | RTTmin |

Fig. 16

41:AVERAGE VALUE INFORMATION

| ADDRESS | RTTave |
|---------|--------|
|         |        |
|         |        |
|         |        |

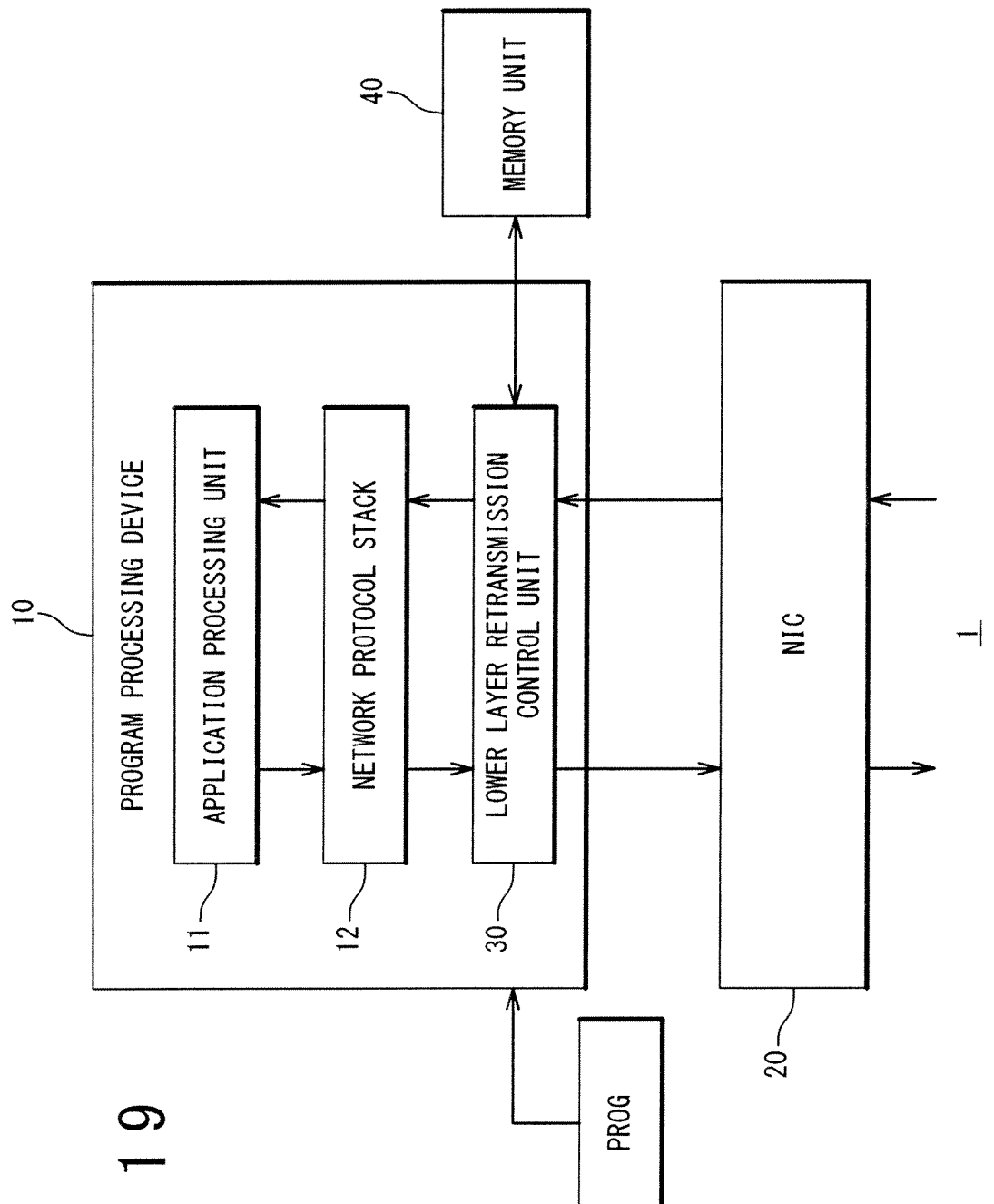

PACKET RETRANSMISSION CONTROL SYSTEM, METHOD AND PROGRAM

CROSS-REFERENCE TO RELATED APPLICATION

This is a continuation of International Application No. PCT/JP2011/054472, filed on Feb. 28, 2011.

TECHNICAL FIELD

The present invention relates to "packet retransmission control" in packet communication. More particularly, the present invention relates to a technique for a case of performing the packet retransmission control in a lower layer than a protocol having a packet retransmission control function.

BACKGROUND ART

One of roles of a TCP (Transmission Control Protocol) in a transport layer is to ensure reliability of packet communication. Packet retransmission control by the TCP is known as a technique for ensuring the reliability of the packet communication.

More specifically, a transmitting device transmits a packet to a receiving device, and the receiving device, when receiving the packet, sends an ACK packet (acknowledgement packet) back to the transmitting device. With reception of the ACK packet, the transmitting device recognizes that the transmitted packet has arrived at the receiving device without any trouble. However, if a packet is dropped in a network between the transmitting device and the receiving device, for example, the transmitting device fails to receive an ACK packet responding to the packet. If the transmitting device does not receive the ACK packet in a predetermined waiting time after transmission of the packet, it retransmits the packet to the receiving device. Note that the predetermined waiting time mentioned above is referred to as a retransmission time out (RTO).

According to Non-Patent Literature 1, the packet retransmission control is performed in a MAC (Media Access Control) layer lower than the transport layer. The reason for this is as follows. As an example, let us consider a network having a very short round trip time (RTT), such as a network inside a data center. In such a network, it is possible by reducing the retransmission time out to the order of microseconds to reduce a flow completion time (FCT) to improve communication efficiency. However, since the TCP is in general implemented in an OS (operating system), the packet retransmission control by the TCP cannot reduce the retransmission time out to the order of microseconds. For example, unit times (Jiffies) in Linux are 10 milliseconds, and therefore a standard TCP of the Linux cannot reduce the retransmission time out to less than 10 milliseconds. In order to solve such a problem, according to Non-patent literature 1, the packet retransmission control is performed in the MAC layer to thereby reduce the retransmission time out.

Moreover, the TCP has a function of "fast retransmission control" that is faster than the RTO-based packet retransmission control. The fast retransmission control of the TCP is described with reference to FIG. 1. A transmitting device sequentially transmits packets PKT1 to PKT5. In response to receipt of the packet PKT1, a receiving device sends back an ACK packet ACK1. Upon receipt of the next packet PKT2, the receiving device recognizes from a sequence number of the packet PKT2 that the received packet PKT2 is an In-Order packet, and sends back a next ACK packet ACK2. It is assumed here that the packet PKT3 is dropped. The receiving device receives the packets PKT4 and PKT5 and determines, based on the sequence numbers of them, that the received packets are Out-of-Order packets. In this case, the receiving device sends back the previous ACK packet ACK2. As a result, the transmitting device redundantly receives the same ACK packet ACK2. If the transmitting device receives such a redundant ACK packet for a predetermined number of times (e.g. three times), the transmitting device determines that a packet drop has occurred, and retransmits the packet PKT3 without waiting for the retransmission time out. This is the fast retransmission control by the TCP.

CITATION LIST

Non Patent Literature

Non-Patent Literature 1: Toru Takamichi, et al., "Ultra-High Speed MAC Technology for Terabit-Class LAN", Proceedings of the IEICE Communications Society Conference (2008)

SUMMARY OF INVENTION

In order to achieve the packet retransmission control in the lower MAC layer as described in Non-Patent Literature 1, sequence numbers for managing the order of transmitted packets are required. In a case where the upper layer is known to be the TCP, the sequence numbers in the TCP can be directly used. However, in a case where the upper layer is a protocol other than the TCP, such as RDMA (Remote Direct Memory Access), FCoE (Fibre Channel Over Ethernet) or UDP (User Datagram Protocol), sequence numbers are not necessarily defined in the upper layer. In order to achieve the packet retransmission control in the lower layer in such the case, it is necessary to use sequence numbers dedicated to the lower layer.

The sequence numbers in the lower layer are sequentially given to transmission packets according to the transmission order. It should be noted here that the sequence numbers in the lower layer are not given separately with respect to each of destinations of the transmission packets. If the sequence numbers in the lower layer are given separately depending on the destinations, it is necessary to perform sequence number management, RTO management, packet retransmission processing and the like separately with respect to each destination. Processing load and a required memory area in the lower layer are significantly increased as the number of destinations increases, and thus practical processing performance cannot be obtained.

Accordingly, the lower layer of the transmitting device gives the sequence numbers to transmission packets only according to the transmission order without depending on the destinations. The lower layer of the receiving device, when receiving a packet having a sequence number in the lower layer, sends back a "lower layer ACK packet" including information on the sequence number. If the lower layer of the transmitting device fails to receive a lower layer ACK packet responding to the transmitted packet within a predetermined RTO, it retransmits the packet.

However, such the technique as in Non-Patent Literature 1 cannot achieve, in the lower layer, the same fast retransmission control as that of the TCP (see FIG. 1).

For example, in the case of the TCP, the sequence numbers are assigned separately with respect to each destination. In this case, the receiving device of each destination can determine whether a received packet is an In-Order packet or an Out-of-Order packet by referring to the sequence number, which enables the fast retransmission control as shown in FIG. 1. On the other hand, the sequence numbers in the lower layer are assigned sequentially in the order of packet transmission without depending on the destinations. In this case, the receiving device of each destination cannot necessarily determine whether a received packet is an In-Order packet or an Out-of-Order packet even by referring to the sequence number in the lower layer. That is, the fast retransmission control as shown in FIG. 1 does not normally work in the lower layer.

An object of the present invention is to achieve the fast retransmission control independent of the RTO in a lower layer than an upper network protocol stack.

In an aspect of the present invention, a packet retransmission control system is provided. The packet retransmission control system has: a network protocol stack that performs packet retransmission control; and a lower layer retransmission control means configured to perform packet retransmission control in a lower layer than the network protocol stack. The lower layer retransmission control means, when transmitting a transmission packet, gives a sequence number indicating a transmission order to the transmission packet. The lower layer retransmission control means receives, from a receiving device receiving the transmission packet as a reception packet, an ACK packet indicating the sequence number of the reception packet. The lower layer retransmission control means refers to the sequence number of the received ACK packet to determine whether or not the lower layer retransmission control means receives the ACK packet in an order of the sequence number. The ACK packet responding to a first transmission packet is a first ACK packet. The ACK packet responding to a second transmission packet that is transmitted following the first transmission packet is a second ACK packet. The ACK packet responding to a third transmission packet that is transmitted after the second transmission packet is a third ACK packet. If the lower layer retransmission control means receives the first ACK packet and receives the third ACK packet following the first ACK packet without receiving the second ACK packet, the lower layer retransmission control means performs fast retransmission control processing. In the fast retransmission control processing, the lower layer retransmission control means determines whether or not to receive the second ACK packet before a fast retransmission determination period passes after a reception time of the third ACK packet. If the lower layer retransmission control means fails to receive the second ACK packet within the fast retransmission determination period, the lower layer retransmission control means retransmits the second transmission packet.

In another aspect of the present invention, a packet retransmission control method is provided. The packet retransmission control method includes: performing packet retransmission control by a network protocol stack; and performing packet retransmission control in a lower layer than the network protocol stack. The performing packet retransmission control in the lower layer includes: (1) giving, when transmitting a transmission packet, a sequence number indicating a transmission order to the transmission packet; and (2) receiving, from a receiving device receiving the transmission packet as a reception packet, an ACK packet indicating the sequence number of the reception packet. The ACK packet responding to a first transmission packet is a first ACK packet. The ACK packet responding to a second transmission packet that is transmitted following the first transmission packet is a second ACK packet. The ACK packet responding to a third transmission packet that is transmitted after the second transmission packet is a third ACK packet. The performing packet retransmission control in the lower layer further includes: (3) referring to the sequence number of the received ACK packet to determine whether or not to the ACK packet is received in an order of the sequence number; and (4) performing fast retransmission control processing, if receiving the first ACK packet and receiving the third ACK packet following the first ACK packet without receiving the second ACK packet. The fast retransmission control processing includes: determining whether or not to receive the second ACK packet before a fast retransmission determination period passes after a reception time of the third ACK packet; and retransmitting the second transmission packet, if failing to receive the second ACK packet within the fast retransmission determination period.

In still another aspect of the present invention, a packet retransmission program that causes a computer to perform packet retransmission control processing is provided. The packet retransmission control processing includes performing packet retransmission control in a lower layer than a network protocol stack that performs packet retransmission control. The performing packet retransmission control in the lower layer includes: (1) giving, when transmitting a transmission packet, a sequence number indicating a transmission order to the transmission packet; and (2) receiving, from a receiving device receiving the transmission packet as a reception packet, an ACK packet indicating the sequence number of the reception packet. The ACK packet responding to a first transmission packet is a first ACK packet. The ACK packet responding to a second transmission packet that is transmitted following the first transmission packet is a second ACK packet. The ACK packet responding to a third transmission packet that is transmitted after the second transmission packet is a third ACK packet. The performing packet retransmission control in the lower layer further includes: (3) referring to the sequence number of the received ACK packet to determine whether or not to the ACK packet is received in an order of the sequence number; and (4) performing fast retransmission control processing, if receiving the first ACK packet and receiving the third ACK packet following the first ACK packet without receiving the second ACK packet. The fast retransmission control processing includes: determining whether or not to receive the second ACK packet before a fast retransmission determination period passes after a reception time of the third ACK packet; and retransmitting the second transmission packet, if failing to receive the second ACK packet within the fast retransmission determination period.

According to the present invention, it is possible to achieve the fast retransmission control independent of the RTO in a lower layer than an upper network protocol stack.

BRIEF DESCRIPTION OF DRAWINGS

The above and other objects, advantages and features of the present invention will be more apparent from the following description of certain exemplary embodiments taken in conjunction with the accompanying drawings.

FIG. 7 is a conceptual diagram showing transmission packet information in the exemplary embodiment of the present invention.

FIG. 11 is a conceptual diagram showing the fast retransmission control information in the exemplary embodiment of the present invention.

FIG. 16 is a conceptual diagram showing average value information in the exemplary embodiment of the present invention.

FIG. 19 is a block diagram showing a modification example of the transceiving device according to the exemplary embodiment of the present invention.

DESCRIPTION OF EMBODIMENTS

Exemplary embodiments of the present invention will be described with reference to the attached drawings.

1. Configuration

Figure 1:
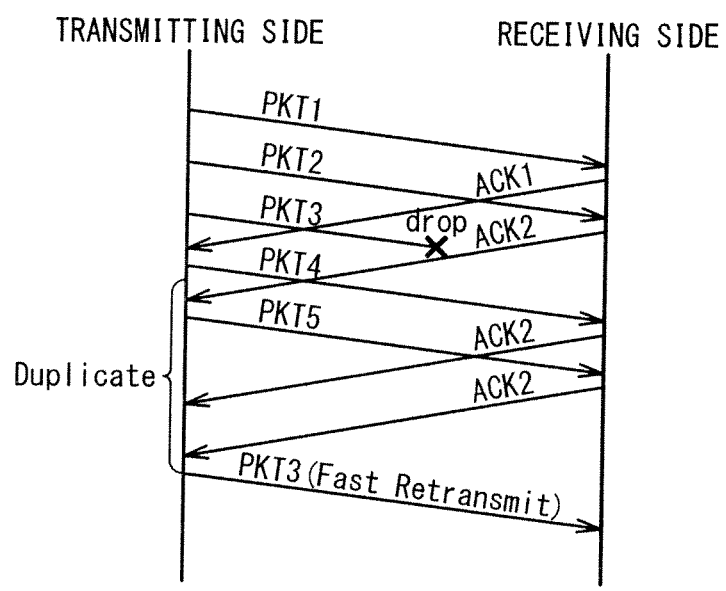
FIG. 1 is a conceptual diagram for explaining fast retransmission control by TCP.
Figure 2:
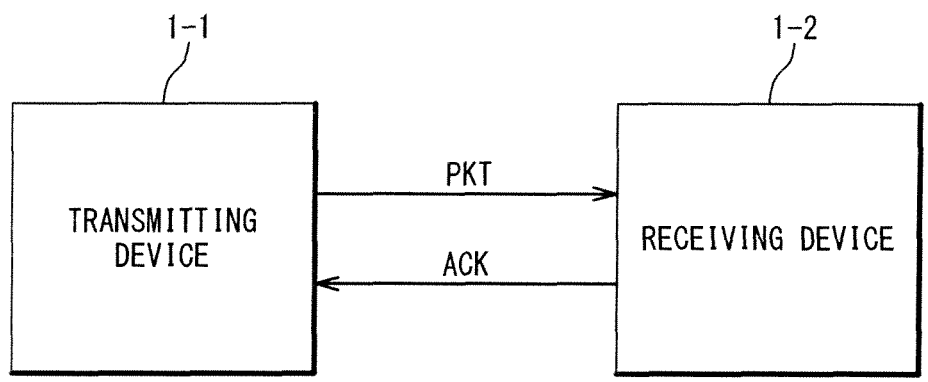
FIG. 2 is a block diagram schematically showing a packet retransmission control system according to an exemplary embodiment of the present invention.

FIG. 2 is a block diagram schematically showing a packet retransmission control system according to the present exemplary embodiment. The packet retransmission control system is provided with a transmitting device 1-1 and a receiving device 1-2. The transmitting device 1-1 and the receiving device 1-2 are connected to each other through a network. The transmitting device 1-1 transmits a transmission packet (PKT) to the receiving device 1-2. The receiving device 1-2 receives the transmission packet from the transmitting device 1-1 as a reception packet, and transmits an ACK packet corresponding to the reception packet to the transmitting device 1-1.

According to the present exemplary embodiment, packet retransmission control is performed not only in an upper layer (e.g. TCP layer) but also in a lower layer (e.g. MAC layer) lower than the upper layer. A "lower layer sequence number" is used for the packet retransmission control in the lower layer. In the following, the lower layer sequence number is simply referred to as a "sequence number", unless otherwise noted. The lower layer of the transmitting device 1-1 gives sequence numbers to transmission packets just in a transmission order without depending on destinations. That is, the sequence numbers are independent of the destinations, but simply indicate the order of transmission of the transmission packets. Upon receipt of a reception packet having a sequence number, the lower layer of the receiving device 1-2 sends a "lower layer ACK packet" indicating the sequence number back to the transmitting device 1-1. In the following, the lower layer ACK packet is simply referred to as an "ACK packet", unless otherwise noted.

Figure 3:
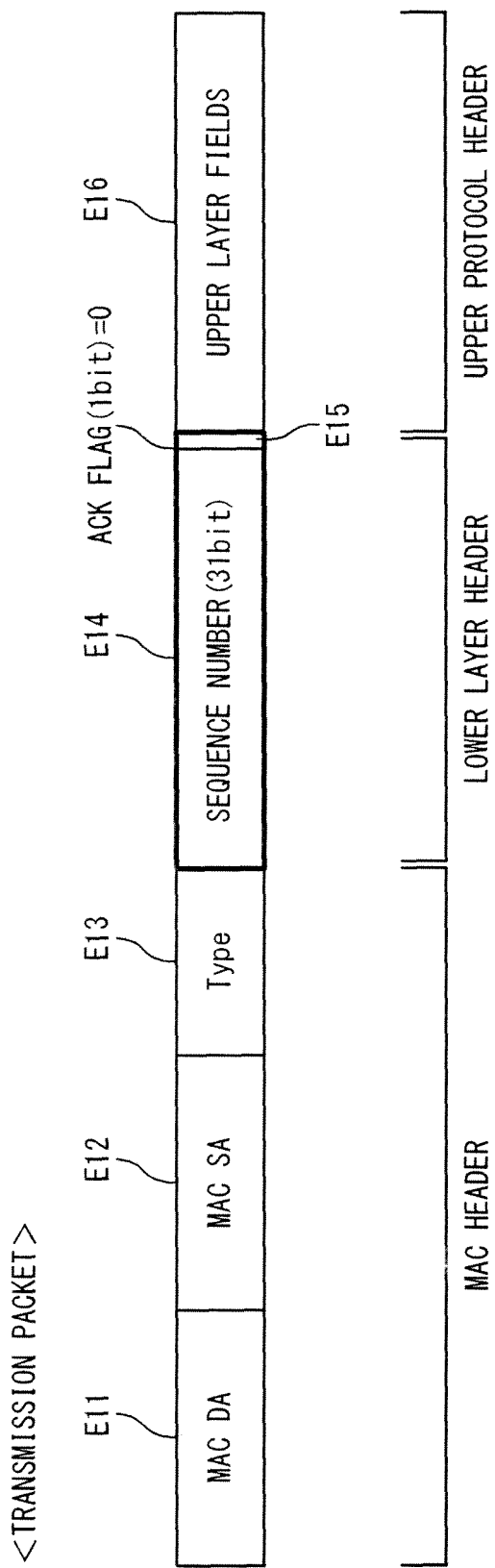
FIG. 3 is a conceptual diagram showing a header of a transmission packet in the exemplary embodiment of the present invention.

FIG. 3 is a conceptual diagram showing a header of a transmission packet. The header of the transmission packet includes fields E11 to E16. The field E11 indicates a destination MAC address (MAC DA). The field E12 indicates a source MAC address (MAC SA). The field E13 indicates an Ethernet (registered trademark) type. The field E14 indicates a 31-bit lower layer sequence number. The field E15 indicates a 1-bit ACK flag that indicates whether or not the packet is an ACK packet. In the case of the transmission packet, the ACK flag is set to "0". The field E16 indicates an upper layer header such as an IP header. Note that if the transmission packet is not a target of the packet retransmission control in the lower layer, the lower layer sequence number and ACK flag are not given.

Figure 4:
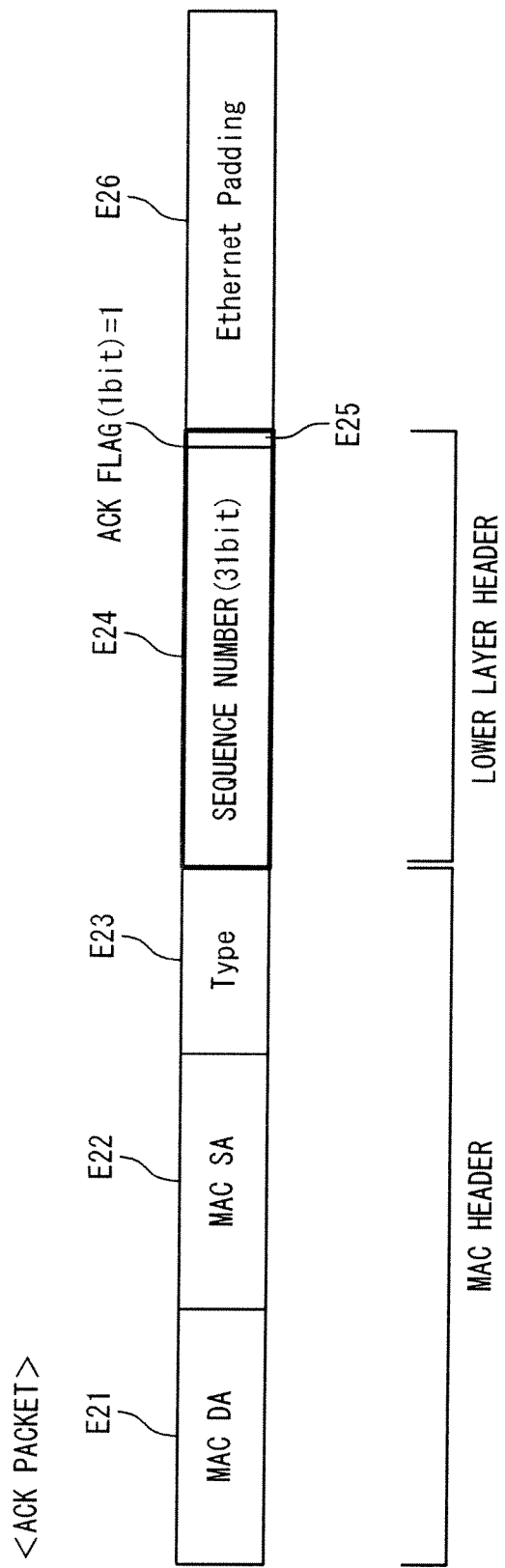
FIG. 4 is a conceptual diagram showing a header of an ACK packet in the exemplary embodiment of the present invention.

FIG. 4 is a conceptual diagram showing a header of an ACK packet. The header of the ACK packet includes fields E21 to E26. The field E21 indicates a destination MAC address (MAC DA). The field E22 indicates a source MAC address (MAC SA). The field E23 indicates an Ethernet (registered trademark) type. The field E24 indicates a 31-bit lower layer sequence number. The field E25 indicates a 1-bit ACK flag that indicates whether or not the packet is an ACK packet. In the case of the ACK packet, the ACK flag is set to "1". The field E26 indicates Ethernet (registered trademark) Padding.

Figure 5:
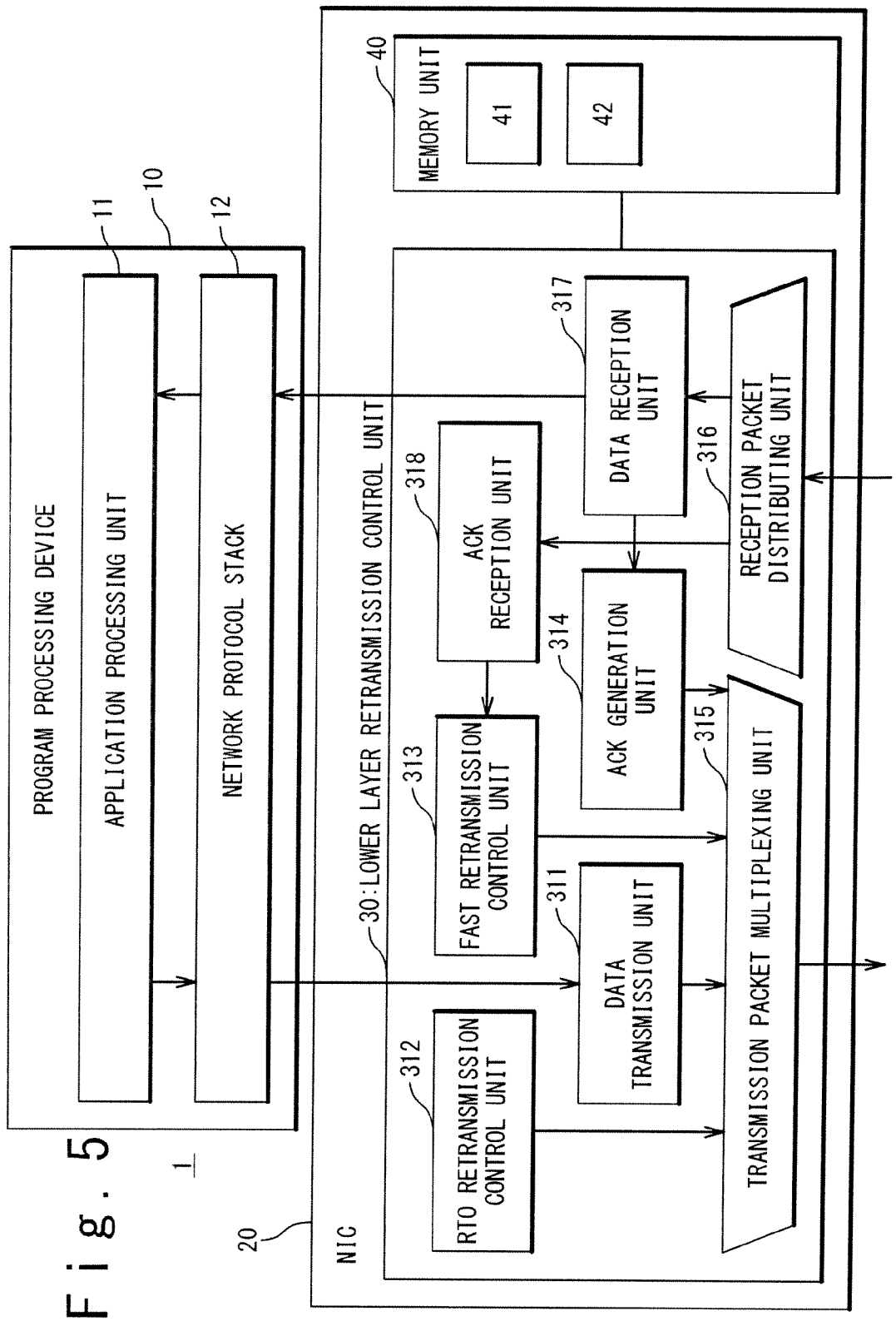
FIG. 5 is a block diagram showing a configuration example of a transceiving device according to the exemplary embodiment of the present invention.

FIG. 5 shows a configuration example of the transceiving device 1 (each of the transmitting device 1-1 and receiving device 1-2) according to the present exemplary embodiment. The transceiving device 1 is provided with a program processing device 10 and a network interface device 20.

The program processing device 10 processes an application and a network protocol stack. The program processing device 10 is achieved by a CPU (Central Processing Unit) or the like of a host such as a server and PC. More specifically, the program processing device 10 is provided with an application processing unit 11 and a network protocol stack 12 that are achieved by executing a program.

The application processing unit 11 processes a user application that performs network communication. The application processing unit 11 issues a request for transmission/reception of network data to the network protocol stack 12.

The network protocol stack 12 is a part of a kernel program of an OS (Operating System) that operates on the CPU. The network protocol stack 12 performs packet transceiving processing and packet retransmission control in the upper layer such as the TCP layer.

The network interface device 20 is, for example, an expansion card or an on-board NIC (Network Interface Card) of a server. The network interface device 20 performs packet transceiving processing and packet retransmission control in the lower layer. More specifically, the network interface device 20 is provided with a lower layer retransmission control unit 30 and a memory unit 40.

The lower layer retransmission control unit 30 performs the packet transceiving processing and the packet retransmission control in the lower layer than the network protocol stack 12. The lower layer retransmission control unit 30 is provided with functional blocks such as a data transmission unit 311, an RTO retransmission control unit 312, a fast retransmission control unit 313, an ACK generation unit 314, a transmission packet multiplexing unit 315, a reception packet distributing unit 316, a data reception unit 317 and an ACK reception unit 318. Detailed processing by each functional block will be described later.

The memory unit 40 is a memory such as an SRAM or DRAM mounted in the network interface device 20. Transmission packet information 41, fast retransmission control information 42 and the like are stored in the memory unit 40. Details of each information will be described later.

2. Packet Transmission Processing

The application processing unit 11 of the transmitting device 1-1 transmits a transmission data to the network protocol stack 12. The network protocol stack divides the transmission data on an MSS (Maximum Segment Size) basis. When a maximum size of a packet that can be transferred through the network is an MTU (Maximum Transfer Unit), the MSS is expressed by "MTU−(size of MAC header)−(size of lower layer header)−(size of upper protocol header)". The size of the lower layer header is notified to the network protocol stack 12 in advance. The network protocol stack 12 adds the MAC header and upper protocol header (see FIG. 3) to the divided data to generate a transmission packet, and then transmits the transmission packet to the lower layer retransmission control unit 30.

Figure 6:
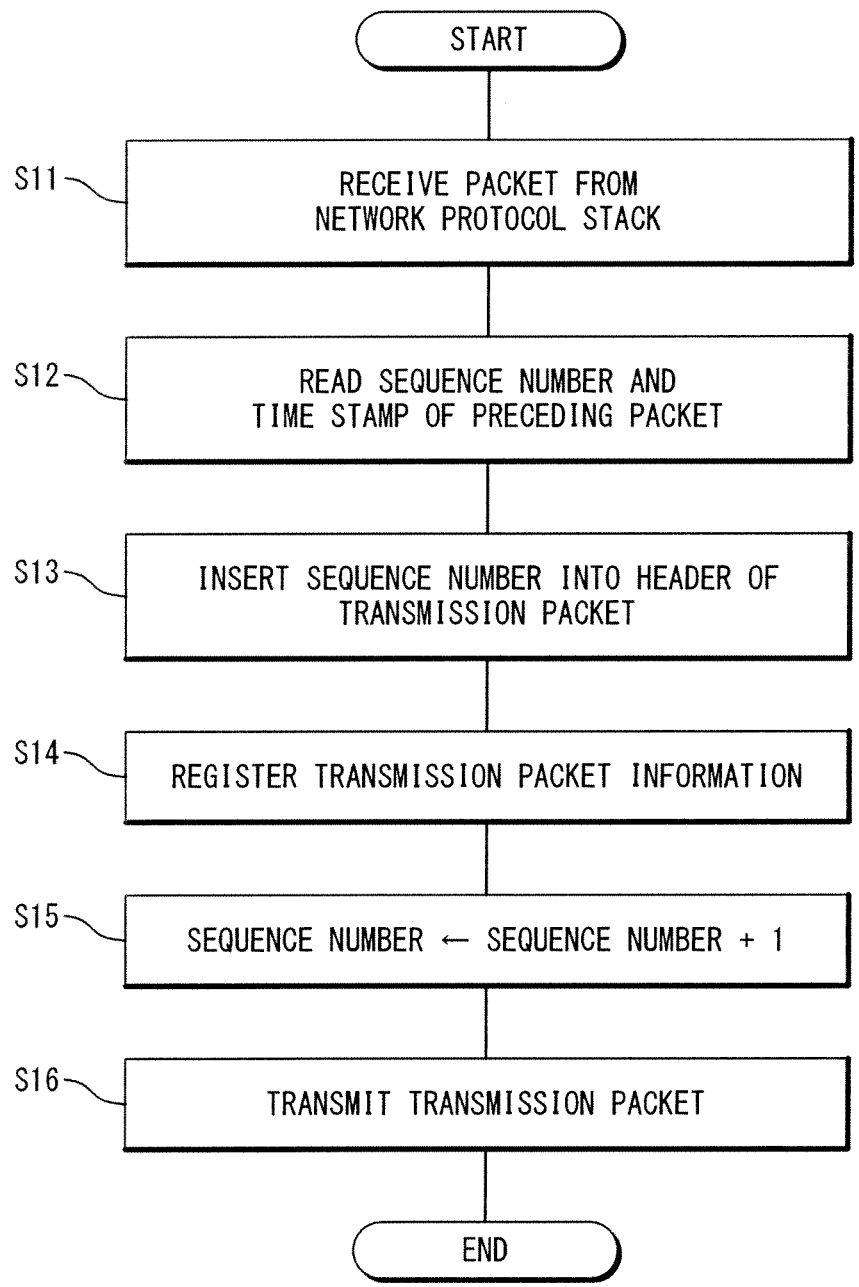
FIG. 6 is a flow chart showing packet transmission processing in the exemplary embodiment of the present invention.

FIG. 6 is a flow chart showing packet transmission processing by the lower layer retransmission control unit 30 of the transmitting device 1-1.

Step S11:

The data transmission unit 311 receives the transmission packet from the network protocol stack 12.

Step S12:

The data transmission unit 311 retains the sequence number to be given to the transmission packet and a transmission time (time stamp) of a preceding transmission packet. The data transmission unit 311 reads the sequence number and the previous transmission time.

Step S13:

The data transmission unit 311 inserts the sequence number into the lower layer header (see FIG. 3) of the transmission packet. Then, the data transmission unit 311 transmits the transmission packet to the transmission packet multiplexing unit 315.

Step S14:

The data transmission unit 311 registers information on the present transmission packet on the transmission packet information 41 stored in the memory unit 40. FIG. 7 shows an example of the transmission packet information 41. In the example shown in FIG. 7, the transmission packet information 41 indicates the sequence number, the destination MAC address and the transmission time (time stamp) of the transmission packet, a difference Δ, and a data main body of the transmission packet. Note that the difference Δ is a packet transmission interval and indicates a difference value in the time stamp between the present transmission packet and the preceding transmission packet. The transmission packet information 41 indicates such the information with respect to each transmitted packet corresponding ACK packet of which is not yet arrived.

Step S15:

The data transmission unit 311 updates the sequence number. More specifically, the data transmission unit 311 increments the sequence number by 1 regardless of a destination of the transmission packet. That is, the sequence number is independent of the destination but simply represents the transmission order of the transmission packet.

Step S16:

The transmission packet is transmitted to an external network through the transmission packet multiplexing unit 315.

3. Time-Out Retransmission Control Processing

The lower layer retransmission control unit 30 of the transmitting device 1-1 performs the packet retransmission control based on the RTO in the lower layer. The RTO in the lower layer is set to be shorter than the RTO in the network protocol stack 12. That is, the lower layer retransmission control unit 30 performs the time out retransmission control by using the shorter RTO than that in the network protocol stack 12.

Figure 8:
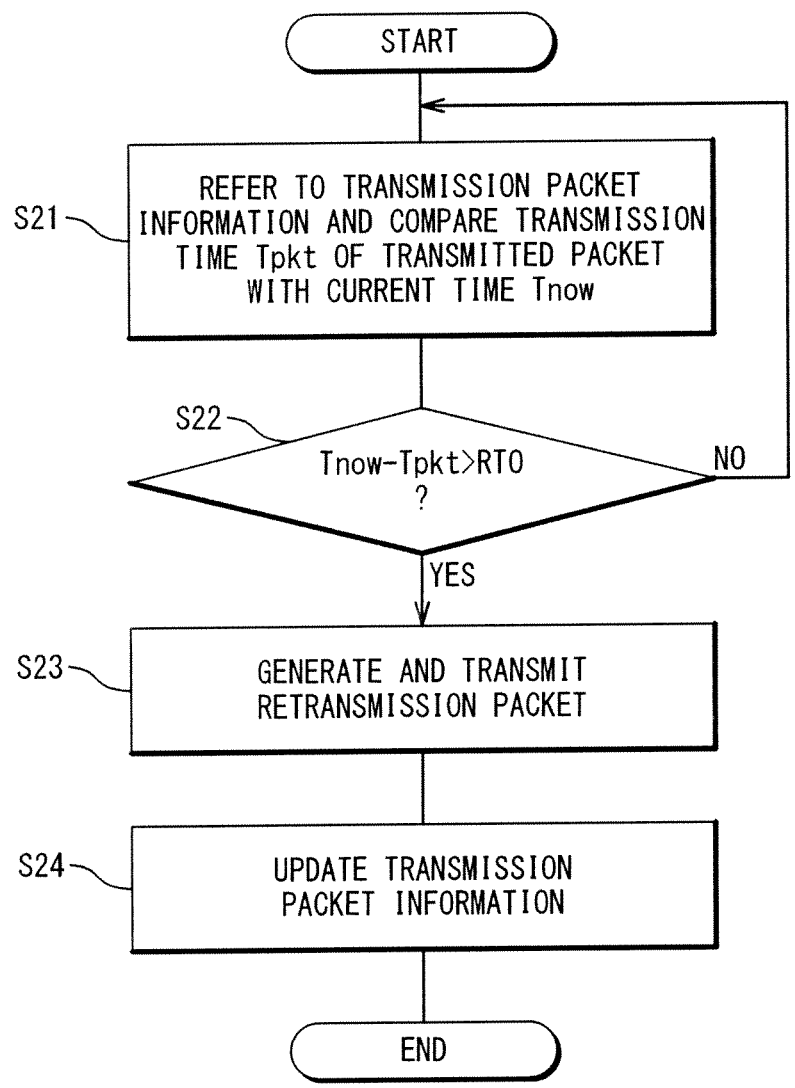
FIG. 8 is a flow chart showing time-out retransmission control processing in the exemplary embodiment of the present invention.

FIG. 8 is a flow chart showing the time out retransmission control processing by the lower layer retransmission control unit 30 of the transmitting device 1-1.

Step S21:

The RTO retransmission control unit 312 refers to the transmission packet information 41 (see FIG. 7) stored in the memory unit 40. Then, the RTO retransmission control unit 312 compares a transmission time Tpkt of a transmitted packet with a current time Tnow.

Step S22:

The RTO retransmission control unit 312 determines whether or not "Tnow−Tpkt" exceeds a predetermined RTO. If "Tnow−Tpkt" exceeds the predetermined RTO (Step S22: Yes), the RTO retransmission control unit 312 performs the next Step S23.

Step S23:

The RTO retransmission control unit 312 reads, from the transmission packet information 41, the data main body of the transmission packet in which time out occurs. Then, the RTO retransmission control unit 312 generates a retransmission packet based on the read data main body, and transmits the retransmission packet to the transmission packet multiplexing unit 315. The retransmission packet is transmitted to the external network through the transmission packet multiplexing unit 315.

Step S24:

The RTO retransmission control unit 312 updates the transmission packet information 41 (transmission time and the like) regarding the retransmitted transmission packet.

4. Packet Reception Processing

Figure 9:
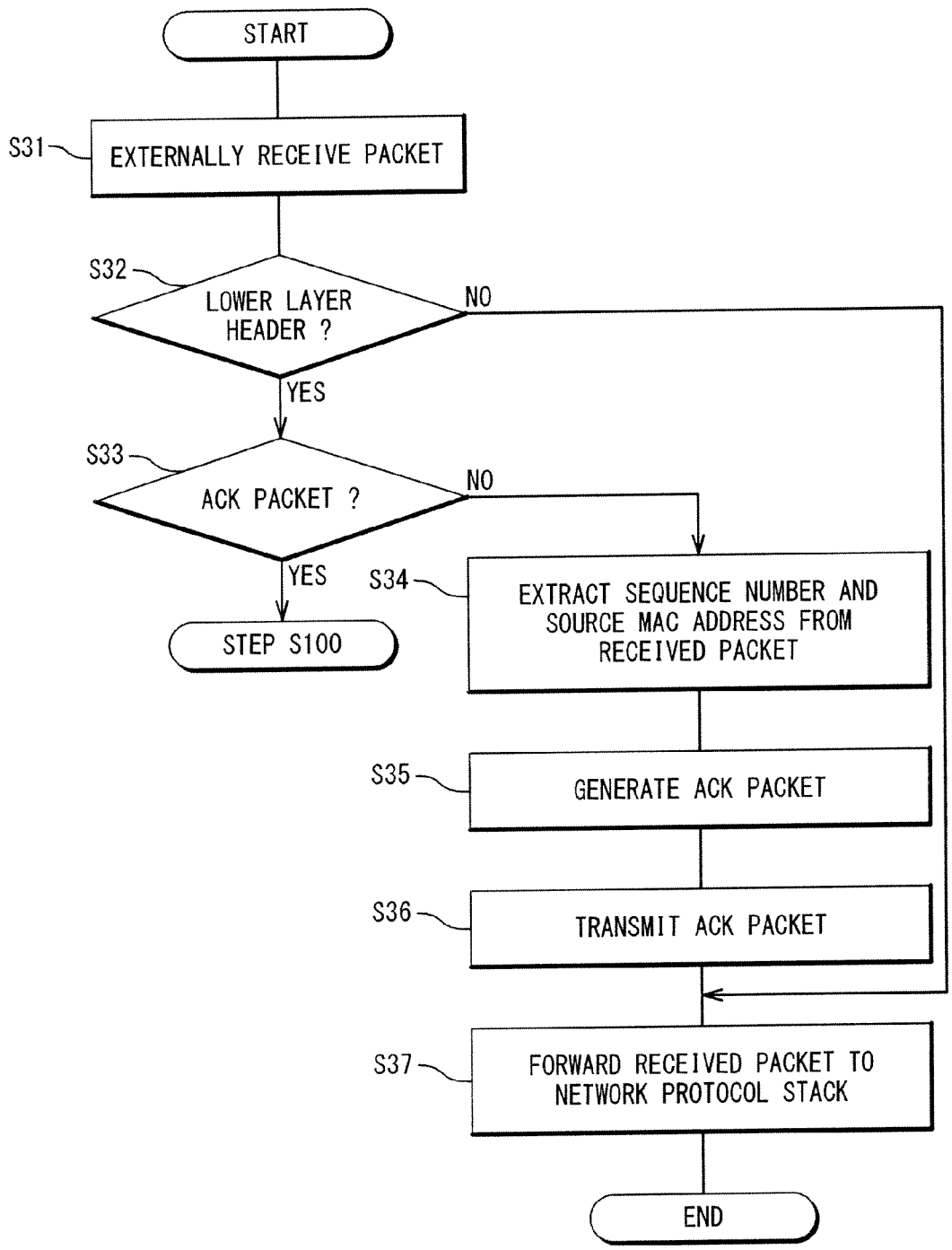
FIG. 9 is a flow chart showing packet reception processing in the exemplary embodiment of the present invention.

Next, processing at a time of packet reception in the lower layer will be described with reference to FIG. 9. The packet reception is classified into two cases: a case where the receiving device 1-2 receives a transmission packet transmitted from the transmitting device 1-1; and a case where the transmitting device 1-1 receives an ACK packet transmitted from the receiving device 1-2. It should be noted that an ACK packet in the upper layer is regarded as a normal packet in the lower layer of the transmitting device 1-1. A method for processing such an upper layer ACK packet in the lower layer is arbitrary, and description thereof is omitted here.

Step S31:

The reception packet distributing unit 316 receives a packet from the external network.

Step S32:

If the received packet has the lower layer header (Step S32; Yes), the reception packet distributing unit 316 performs Step S33. On the other hand, if the received packet does not have the lower layer header (Step S32; No), the reception packet distributing unit 316 transmits the received packet to the data reception unit 317.

Step S33:

The reception packet distributing unit 316 refers to the ACK flag in the lower layer header to determine whether or not the received packet is an ACK packet. A case where the received packet is an ACK packet (Step S33; Yes) corresponds to the case where the transmitting device 1-1 receives the ACK packet transmitted from the receiving device 1-2. In this case, the reception packet distributing unit 316 of the transmitting device 1-1 forwards the ACK packet to the ACK reception unit 318. Then, the processing proceeds Step S100. The Step S100 (ACK packet reception processing) will be described in detail in the next Section 5.

On the other hand, a case where the received packet is not an ACK packet (Step S33; No) corresponds to the case where the receiving device 1-2 receives a transmission packet transmitted from the transmitting device 1-1. In this case, the reception packet distributing unit 316 of the receiving device 1-2 forwards the received packet to the ACK generation unit 314 through the data reception unit 317. Then, the processing proceeds to Step S34.

Step S34:

The ACK generation unit 314 extracts the sequence number and the source MAC address from the received picket.

Step S35:

The ACK generation unit 314 generates an ACK packet that acknowledges the reception packet. Here, the destination MAC address of the generated ACK packet is set to the source MAC address extracted in Step S34. Moreover, the sequence number of the generated ACK packet is set to be equal to the sequence number of the received packet.

Step S36:

The ACK generation unit 314 transmits the ACK packet to the transmission packet multiplexing unit 315. The ACK packet is sent back to the transmitting device 1-1 from the transmission packet multiplexing unit 315.

Step S37:

The data reception unit 317 forwards the received packet to the network protocol stack 12. If the received packet has the lower layer header, the lower layer header is removed here.

5. ACK Packet Reception Processing

Next, processing (Step S100) in the case where the transmitting device 1-1 receives a lower layer ACK packet is described in detail. According to the present exemplary embodiment, "fast retransmission control processing in the lower layer" may be performed triggered by receipt of a lower layer ACK packet. An outline of the fast retransmission control processing according to the present exemplary embodiment will be first described with reference to FIG. 10.

The transmitting device 1-1 transmits a first transmission packet PKT1 (sequence number=#1) at a time ts1. The transmitting device 1-1 transmits a second transmission packet PKT2 (sequence number=#2) following the first transmission packet PKT1. A transmission time of the second transmission packet PKT2 is ts2. At a time ts3 after that, the transmitting device 1-1 transmits a third transmission packet PKT3 (sequence number=#3).

An ACK packet responding to the first transmission packet PKT1 is a first ACK packet ACK1 (sequence number=#1). An ACK packet responding to the second transmission packet PKT2 is a second ACK packet ACK2 (sequence number=#2). An ACK packet responding to the third transmission packet PKT3 is a third ACK packet ACK3 (sequence number=#3). An ACK packet whose sequence number is continuous with that of the previously received ACK packet is hereinafter referred to as an "In-Order ACK packet". An ACK packet other than the In-Order ACK packet is hereinafter referred to as an "Out-of-Order ACK packet".

At a time tr1, the transmitting device 1-1 receives the first ACK packet ACK1. Here, let us consider a case where the transmitting device 1-1 receives an Out-of-Order ACK packet following the first ACK packet ACK1. That is, let us consider a case where the transmitting device 1-1 receives the third ACK packet ACK3 following the first ACK packet ACK1 without receiving the second ACK packet ACK2. The transmitting device 1-1 can recognize, from the sequence number #1 of the previously received first ACK packet ACK1 and the sequence number #3 of the presently received third ACK packet ACK3, that the transmitting device 1-1 has received the Out-of-Order ACK packet.

The causes of the transmitting device 1-1 receiving the Out-of-Order ACK packet include the following two. The first cause is a packet drop on a network path between the transmitting device 1-1 and the receiving device 1-2. The second cause is a difference in RTT (Round Trip Time).

Figure 10:
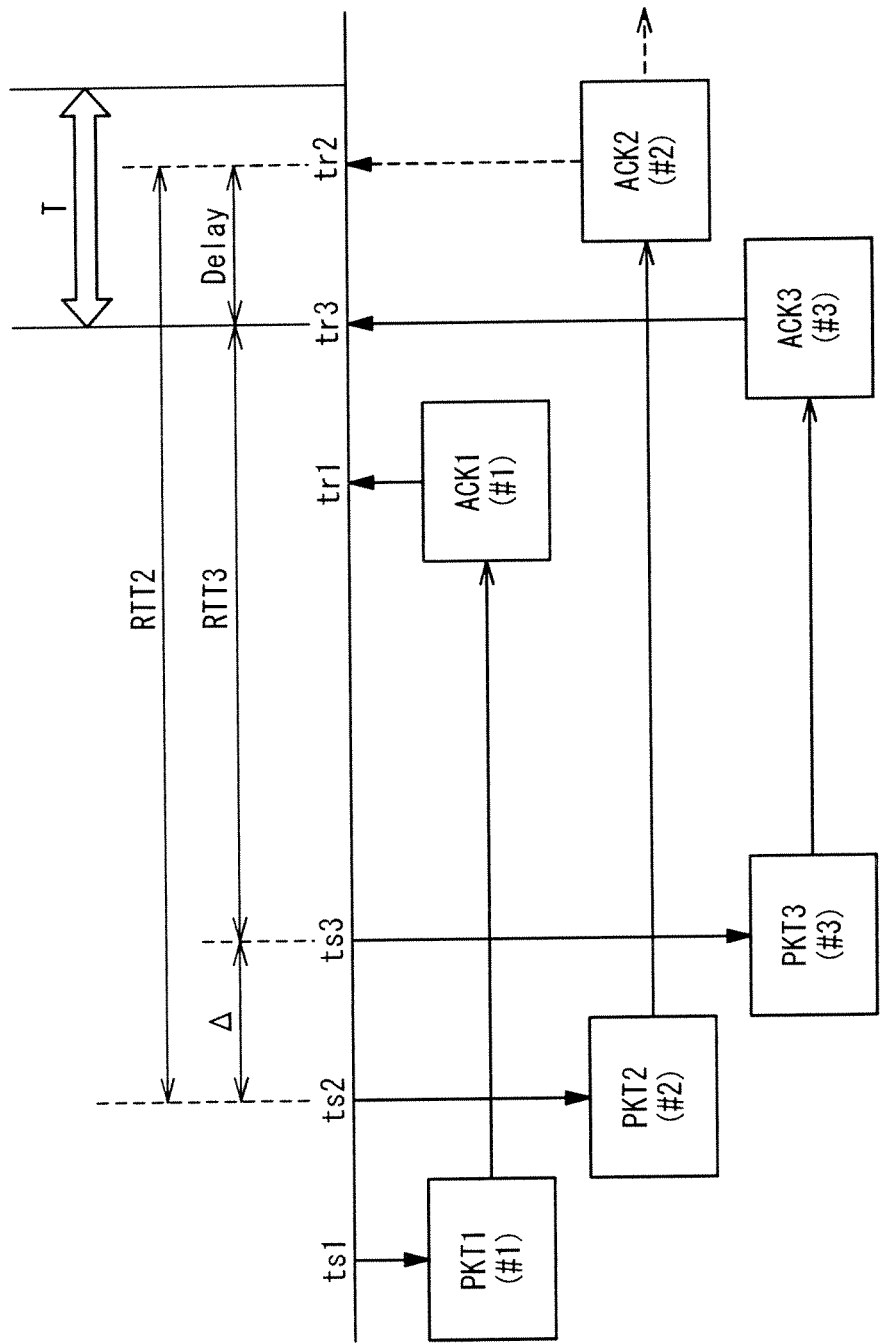
FIG. 10 is a diagram for explaining the fast retransmission control processing in the exemplary embodiment of the present invention.

First, the RTT is considered. The RTT is a time from the transmission time of the transmission packet to the reception time of the corresponding ACK packet. The RTT is not necessarily uniform, but may be different depending on che destinations of the transmission packets. In FIG. 10, for example, RTT2 is a time from the transmission time ts2 of the second transmission packet PKT2 to a reception time tr2 of the second ACK packet ACK2, and RTT3 is a time from the transmission time ts3 of the third transmission packet PKT3 to a reception time tr3 of the third ACK packet ACK3. In a case where RTT2 is larger than RTT3 as shown in FIG. 10, the second ACK packet ACK2 may arrive later than the arrival of the third packet ACK3. A delay time Delay from the reception time tr3 of the Out-of-Order third ACK packet ACK3 to the reception time tr2 of the In-Order second ACK packet ACK2 is expressed by the following Equation (1).

$$Delay = RTT2 - RTT3 - \Delta \quad \text{Equation (1)}$$

Here, $\Delta$ represents a difference between the transmission time ts3 of the third transmission packet PKT3 and the transmission time ts2 of the second transmission packet PKT2, and is given by "ts3−ts2". The difference $\Delta$ can be obtained from the transmission packet information 41 shown in FIG. 7.

Since the RTT takes various values depending on the destinations and the like, it is possible to define a certain distribution range with regard to the RTT. A parameter serving as an index of an upper limit of the distribution range is hereinafter referred to as "RTTmax", and a parameter serving as an index of a lower limit of the distribution range is hereinafter referred to as "RTTmin". In this case, a maximum delay time Delay (Max) that is a maximum value of the delay time Delay is expressed by the following Equation (2).

$$Delay(Max) = RTTmax - RTTmin - \Delta \quad \text{Equation (2)}$$

If the second ACK packet ACK 2 does not arrive even after the maximum delay time Delay (Max) has passed after the time tr3, it is very likely that the packet drop has occurred. Therefore, in this case, retransmission of the second transmission packet PKT2 is carried out without waiting for the packet retransmission based on the RTO. This is the "fast retransmission in the lower layer" according to the present exemplary embodiment.

A summary is as follows. The transmitting device 1-1 performs fast retransmission control processing, triggered by the receipt of the Out-of-Order third ACK packet ACK3 at the time tr3. In the fast retransmission control processing, the transmitting device 1-1 determines whether or not to receive the In-Order second ACK packet ACK 2 before a "fast retransmission determination period T" passes after the time tr3. The fast retransmission determination period T depends on the RTT, and is expressed by the following Equation (3).

$$T = \text{Delay(Max)} = RTT_{max} - RTT_{min} - \Delta \qquad \text{Equation (3)}$$

If the transmitting device 1-1 fails to receive the second ACK packet ACK2 within the fast retransmission determination period T, the transmitting device 1-1 regards the second transmission packet PKT2 as being dropped, and performs the retransmission of the second transmission packet PKT2. If two or more sequence numbers are missing, the retransmission is performed for transmission packets having the same sequence numbers as those of all ACK packets that have not yet arrived.

FIG. 11 shows the fast retransmission control information 42 which is necessary for performing the fast retransmission control. The fast retransmission control information 42 is stored in, for example, the memory unit 40. The fast retransmission control information 42 includes reference ACK packet information and RTT range information. A reference ACK packet is the last received In-Order ACK packet. In the example shown in FIG. 10, the first ACK packet ACK1 is the reference ACK packet. The reference ACK packet information includes the sequence number and the arrival time of the reference ACK packet. The reference ACK packet information is used for determining whether the presently received ACK packet is In-Order or Out-of-Order. The RTT range information indicates the above-described parameters RTTmax and RTTmin, and is used for calculating the fast retransmission determination period T. The RTT range information is updated as appropriate.

Hereinafter, various processing examples will be described.

5-1. First Example

Figure 12:
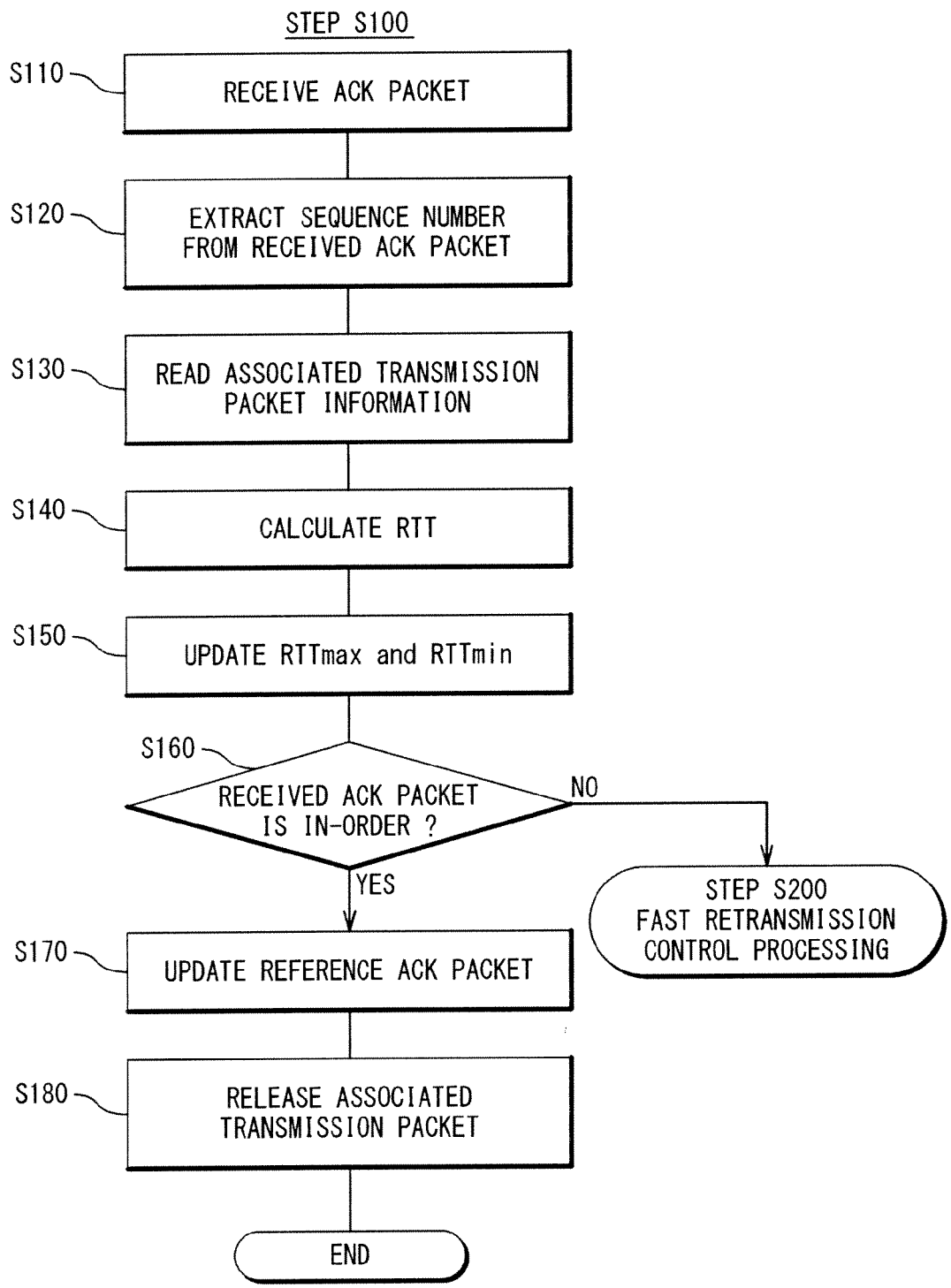
FIG. 12 is a flow chart showing a first example of ACK packet reception processing in the exemplary embodiment of the present invention.

FIG. 12 is a flow chart showing a first example of Step S100.

Step S110:
The ACK reception unit 318 of the lower layer retransmission control unit 30 receives an ACK packet.

Step S120:
The ACK reception unit 318 extracts the sequence number from the header of the received ACK packet.

Step S130:
The ACK reception unit 318 refers to the transmission packet information 41 (see FIG. 7) to read information (transmission time and the like) on a transmission packet having the same sequence number as that extracted in Step S120.

Step S140:
The ACK reception unit 318 calculates an RTT regarding the received ACK packet on the basis of the transmission time obtained in Step S130 and the reception time of the received ACK packet.

Step S150:
The ACK reception unit 318 uses the RTT calculated in Step S140 to update RTTmax and RTTmin indicated by the fast retransmission control information 42, as necessary. More specifically, in a case of the calculated RTT>RTTmax, the ACK reception unit 318 updates RTTmax to the calculated RTT. Also, in a case of the calculated RTT<RTTmin, the ACK reception unit 318 updates RTTmin to the calculated RTT. That is, RTTmax and RTTmin are respectively set to a maximum value and a minimum value of RTTs having been calculated so far. Note that, in an initial state, RTTmax and RTTmin are set to appropriate initial values, respectively.

Step S160:
Moreover, the ACK reception unit 318 refers to the sequence number to determine whether or not the ACK packet is received in the order of the sequence numbers. In other words, the ACK reception unit 318 determines whether the received ACK packet is In-Order or Out-of-Order. More specifically, the ACK reception unit 318 compares the sequence number extracted in Step S120 with a sequence number (reference sequence number) of the reference ACK packet indicated by the fast retransmission control information 42.

If the sequence number of the received ACK packet is not equal to "the reference sequence number+1", the received ACK packet is an Out-of-Order ACK packet (Step S160; No). In this case, the lower layer retransmission control unit 30 performs the fast retransmission control processing (Step S200). Step S200 will be described later.

On the other hand, if the sequence number of the received ACK packet is equal to "the reference sequence number+1", the received ACK packet is an In-Order ACK packet (Step S160; Yes). In this case, the processing proceeds to Step S170.

Step S170:
The ACK reception unit 318 sets the presently received In-Order ACK packet as a latest reference ACK packet. That is, the ACK reception unit 318 updates the reference ACK packet information in the fast retransmission control information 42 to information on the presently received ACK packet.

Step S180:
The ACK reception unit 318 releases the transmission packet having the same sequence number as that of the presently received ACK packet. That is, the ACK reception unit 318 deletes an entry read in the above Step S130 from the transmission packet information 41.

Figure 13:
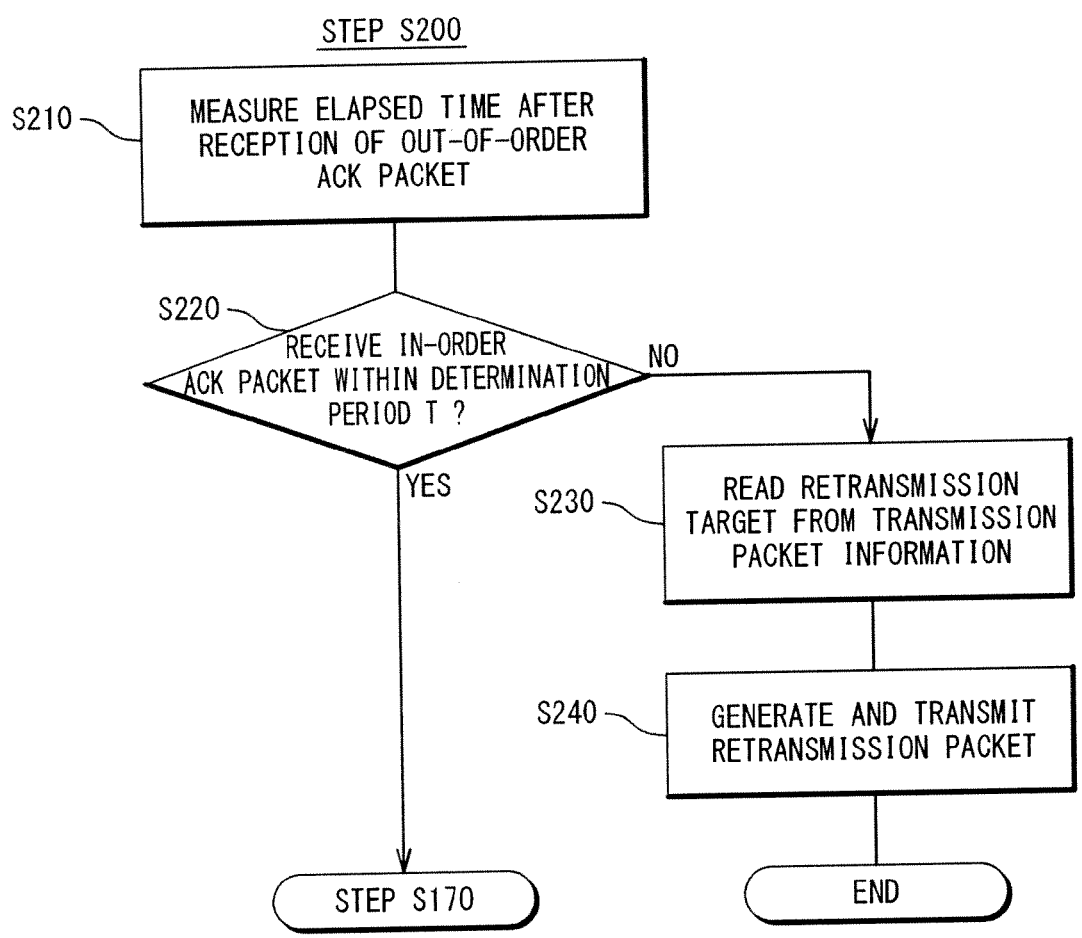
FIG. 13 is a flow chart showing the fast retransmission control processing in the exemplary embodiment of the present invention.

Next, the fast retransmission control processing (Step S200) will be described with reference to FIG. 13.

Step S210:
The fast retransmission control unit 313 measures an elapsed time after the receipt of the Out-of-Order ACK packet. In the case of the example in FIG. 10, the fast retransmission control unit 313 measures an elapsed time after the reception time tr3 of the third ACK packet ACK3.

Step S220:
The fast retransmission control unit 313 determines whether or not to receive the In-Order second ACK packet ACK2 before the fast retransmission determination time T passes after the time tr3. The fast retransmission determination period T is given by the above-described Equation (3). The Parameters RTTmax and RTTmin in the Equation (3) are obtained from the fast retransmission control information 42. The difference $\Delta$ can be calculated by referring to the transmission packet information 41. That is, the fast retransmission control unit 313 can calculate the fast retransmission determination period T on the basis of the transmission packet information 41 and fast retransmission control information 42.

If the In-Order second ACK packet ACK2 is received within the fast retransmission determination period T (Step S220; Yes), retransmission of the second transmission packet PKT2 is not necessary. In this case, the processing proceeds to Step S170 without performing the packet retransmission.

On the other hand, if the In-Order second ACK packet ACK2 is not received within the fast retransmission determination period T (Step S220; No), the fast retransmission control unit 313 regards the second transmission packet PKT2 as being dropped, and performs the retransmission processing for the second transmission packet PKT2. In this case, the processing proceeds to Step S230.

Step S230:

The fast retransmission control unit 313 reads the data main body of the retransmission target from the transmission packet information 41.

Step S240:

Then, the fast retransmission control unit 313 generates a retransmission packet on the basis of the read data main body, and transmits the retransmission packet to the transmission packet multiplexing unit 315. The retransmission packet is transmitted to the external network through the transmission packet multiplexing unit 315.

According to the present exemplary embodiment, as described above, it is possible to achieve the fast retransmission control independent of the RTO even in the lower layer than the network protocol stack 12.

As an example, let us consider a situation where $\Delta=1.2$ μsec (equivalent to an approximately 10 Gbps link), RTTmin=20 μsec, and RTTmax=25 μsec. In this case, the fast retransmission determination period T is 3.8 μsec. Therefore, even in the case of RTT3=RTTmax, the fast retransmission of the second transmission packet PKT2 is performed in approximately 30 μsec after the transmission of the second transmission packet PKT2. Whereas, regarding the RTO-based packet retransmission control, the RTO is typically set to a value (few hundreds μsec) sufficiently larger than the RTT in order to prevent erroneous retransmission. According to the present exemplary embodiment, the fast retransmission can be achieved in a sufficiently shorter time than the RTO even in the lower layer. It is therefore possible to reduce the FCT and thus to improve the communication efficiency.

2. Second Example

Due to defective setting of a communication path, path change or the like, the RTT to be measured may become very large. If such an extreme RTT is used for updating RTTmax, the fast retransmission determination period T becomes unnecessarily long. If the fast retransmission determination period T becomes too long, the fast retransmission is not performed at an appropriate timing, resulting in a reduction in effects. For this reason, as a second example, we propose a flow that does not update RTTmax if an extremely long RTT is measured.

Figure 14:
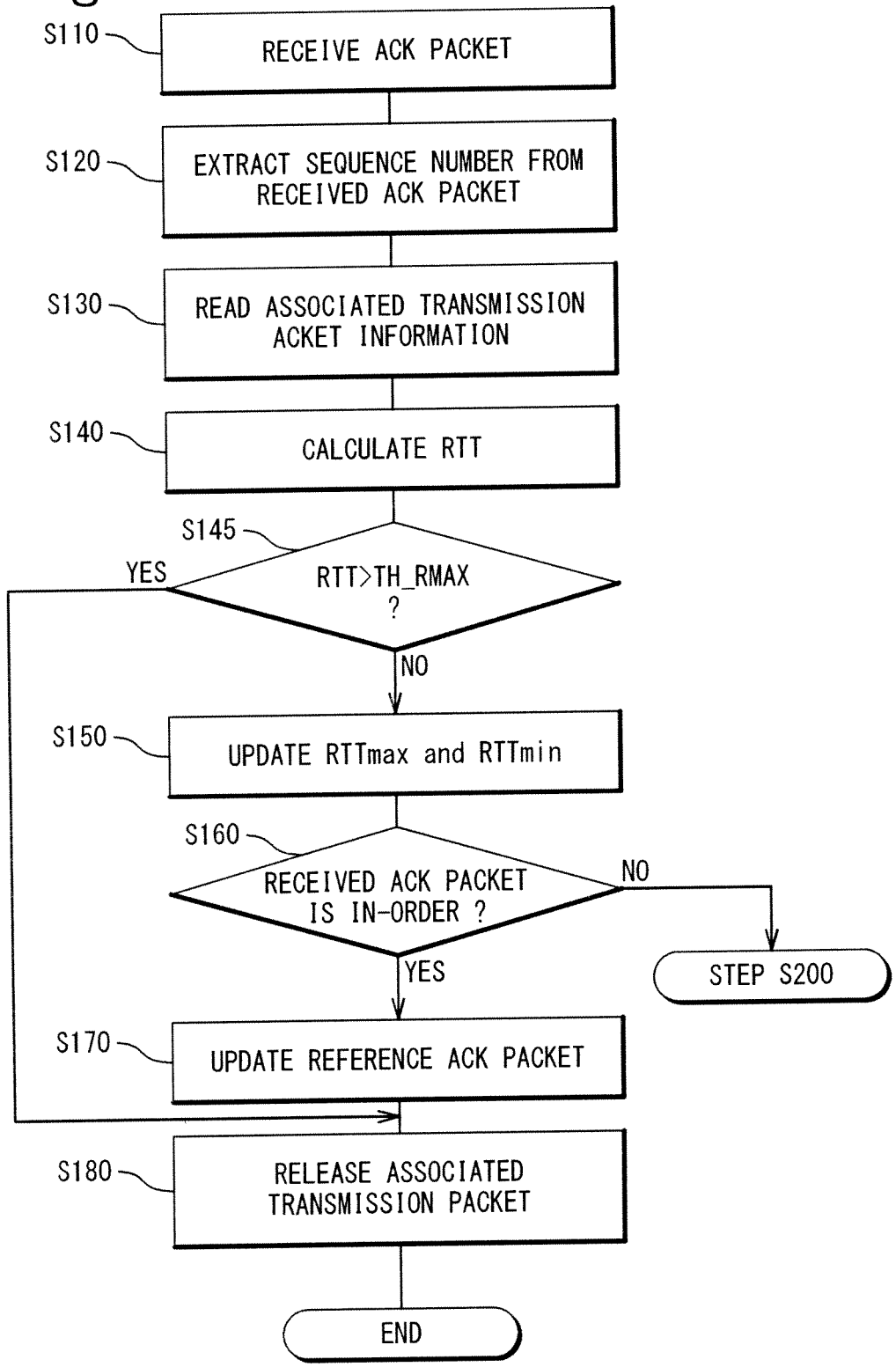
FIG. 14 is a flow chart showing a second example of the ACK packet reception processing in the exemplary embodiment of the present invention.

FIG. 14 is a flow chart showing the second example of Step S100. As compared with the flow shown in FIG. 12, Step S145 is added between Steps S140 and S145. The other processing is the same as in the case of the first example, and an overlapping description will be omitted as appropriate.

Step S145:

The ACK reception unit 318 compares the RTT calculated in Step S140 with a predetermined threshold value TH_R-MAX. If the calculated RTT is more than the predetermined threshold value TH_RMAX (Step S145; Yes), the ACK reception unit 318 skips Steps S150 to S170 and performs Step S180. On the other hand, if the calculated RTT is equal to or less than the predetermined threshold value TH_RMAX (Step S145; No), the ACK reception unit 318 perform the same processing as in the case of the first example.

According to the second example, the same effects as in the first example can be obtained. Furthermore, it is possible to keep the fast retransmission control processing working normally even in the case where an anomalously large RTT is measured.

5-3. Third Example

Figure 15:
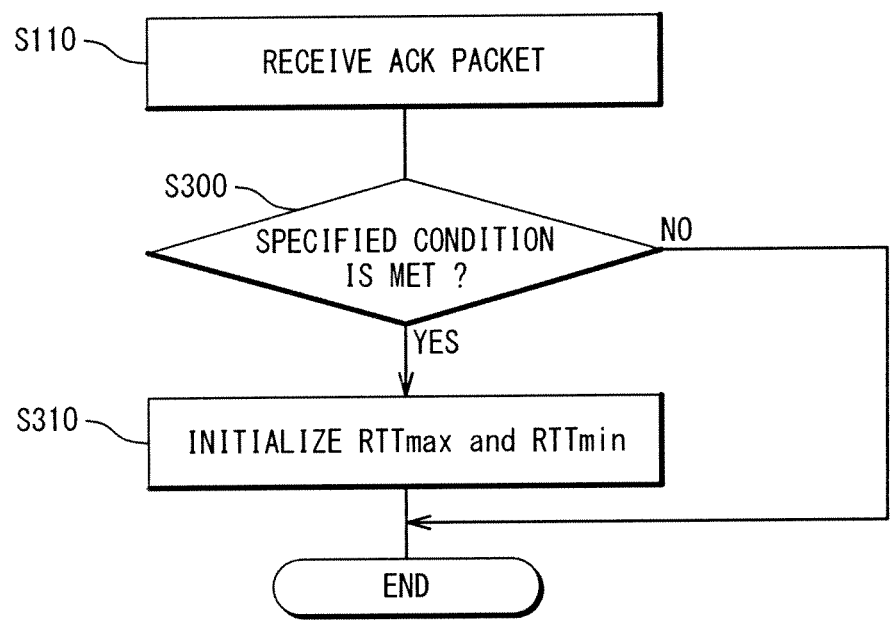
FIG. 15 is a flow chart showing a third example of the ACK packet reception processing in the exemplary embodiment of the present invention.

In a third example, the parameters RTTmax and RTTmin are reset every time a specified condition is met, in order to reflect the latest network state in the parameters RTTmax and RTTmin. FIG. 15 shows a processing flow in the third example. The processing flow shown in FIG. 15 is performed in parallel to Step S100.

Step S300:

Upon receipt of an ACK packet (Step S110), the ACK reception unit 318 determines whether or not the specified condition is met.

Step S310:

If the specified condition is met (Step S300; Yes), the ACK reception unit 318 resets (refreshes) the parameters RTTmax and RTTmin. For example, the ACK reception unit 318 sets the parameters RTTmax and RTTmin to the RTT calculated in the above Step S140.

As the specified condition, the following examples are possible.

(Condition 1) The number of ACK packets received exceeds a specified value RT_REFRESH_ACK: In this case, the parameters RTTmax and RTTmin and the ACK packet reception count value are reset every time the number of ACK packets received exceeds the specified value RT_REFRESH_ACK.

(Condition 2) A data transmission rate measured by the data transmission unit 311 falls below a predetermined threshold value TH_REFRESH_RATE: The data transmission rate is decreased when a flow is disconnected, and therefore the flow disconnection (i.e. change in network state) can be detected by comparing the data transmission rate with the predetermined threshold value TH_REFRESH_RATE.

(Condition 3) A predetermined time TH_REFRESH_TIME has passed: In this case, the parameters RTTmax and RTTmin and a timer are reset every predetermined time TH_REFRESH_TIME.

According to the third example, the same effects as in the first effect can be obtained. Furthermore, appropriate fast retransmission control processing reflecting the latest network state can be performed.

5-4. Fourth Example

In a fourth example, an average value RTTave of the RTTs is used. In the present example, average value information 43 as shown in FIG. 16 is stored in the memory unit 40. The average value information 43 indicates the average value RTTave of the RTTs with respect to each source MAC address of the ACK packet (each destination MAC address of the transmission packet).

Figure 17:
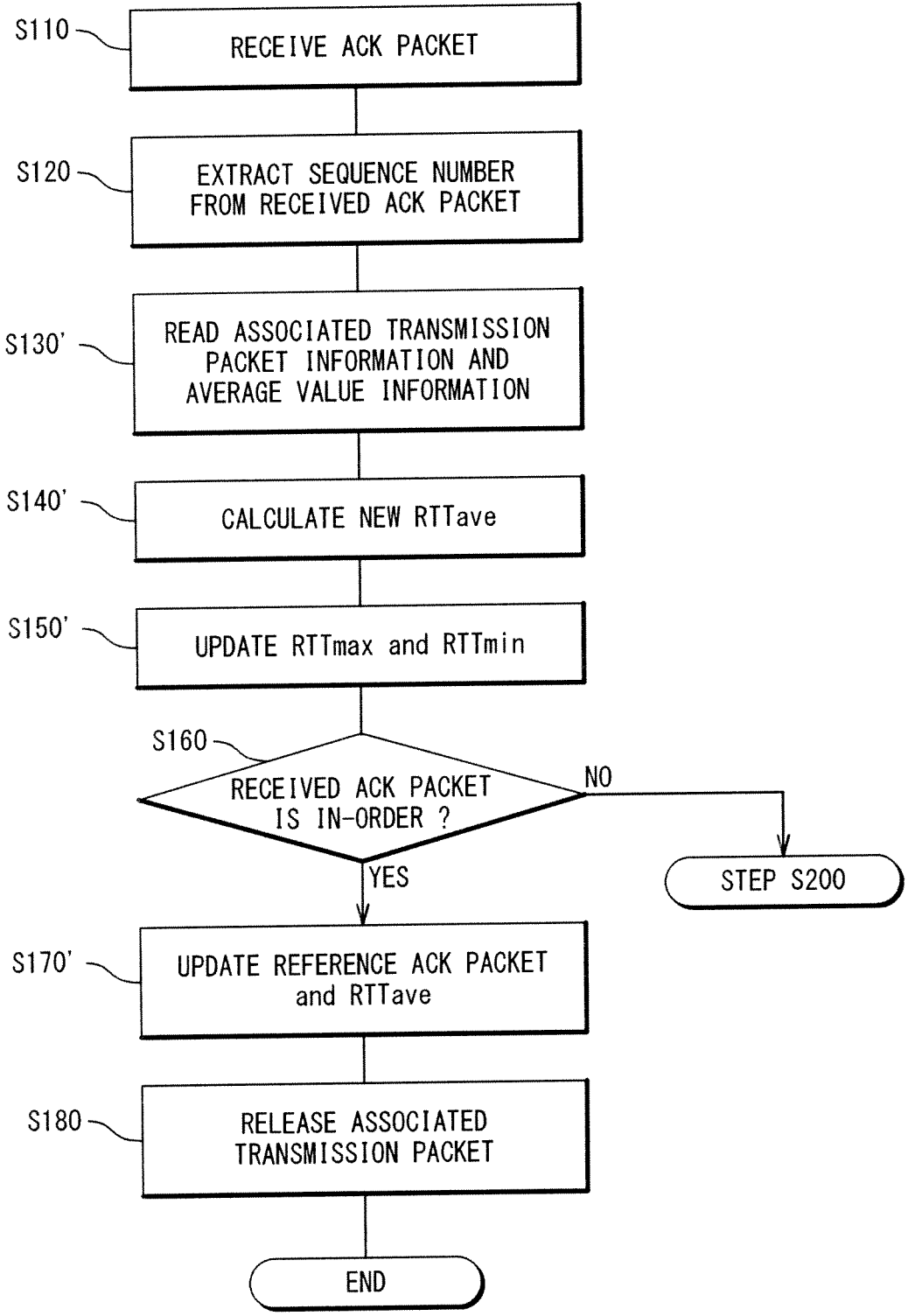
FIG. 17 is a flow chart showing a fourth example of the ACK packet reception processing in the exemplary embodiment of the present invention.

FIG. 17 is a flow chart showing the fourth example of Step S100. In the present example, Steps S130, S140, S150 and S170 are respectively replaced by Steps S130, S140, S150 and S170. Description overlapping with the first example will be omitted as appropriate.

Step S130'

As in the case of Step S130, the ACK reception unit 313 refers to the transmission packet information 41 to read information (transmission time and the like) on a transmission packet having the same sequence number as that of the received ACK packet. Furthermore, the ACK reception unit 318 refers to the average value information 43 and the source MAC address of the received ACK packet to read the average value RTTave (hereinafter referred to as "RTTold") associated with the source.

Step S140':

As in the case of Step S140, the ACK reception unit 318 calculates the RTT (hereinafter referred to as "RTTmeasure") regarding the received ACK packet. Furthermore, the ACK reception unit 318 calculates a new average value RTTave (hereinafter referred to as "RTTnew") regarding the received ACK packet. For example, RTTnew is calculated by the following Equation (4). A parameter g in the Equation (4) is set to, for example, 0.2.

$$RTTnew = (1-g) \times RTTold + g \times RTTmeasure \qquad \text{Equation (4)}$$

Step S150':

The ACK reception unit 318 uses RTTnew calculated in Step S140' to update RTTmax and RTTmin indicated by the fast retransmission control information 42, as necessary. More specifically, in the case of RTTnew>RTTmax, the ACK reception unit 318 updates RTTmax to RTTnew. Also, in the case of RTTnew<RTTmin, the ACK reception unit 318 updates RTTmin to RTTnew. That is, RTTmax and RTTmin are respectively set to the maximum and minimum values of RTTave having been calculated so far.

Step S170':

As in the case of Step S170, the ACK reception unit 318 updates the reference ACK packet information in the fast retransmission control information 42. Furthermore, the ACK reception unit 318 uses RTTnew calculated in Step S140 to update the average value information 43.

According to the fourth example, the same effects as in the first example can be obtained. Furthermore, it is possible by using the average value RTTave for each destination to keep the fast retransmission control processing working normally even in the case where an anomalously large RTT is measured. That is, the fast retransmission control processing can be performed with more high accuracy.

5-5. Fifth Example

In a fifth example, the fast retransmission determination period T is expressed by the following Equation (5).

$$T = RTTmax - RTTmin - \Delta + \alpha \qquad \text{Equation (5)}$$

The parameter $\alpha$ is appropriately set by a network administrator or a user. By introducing the parameter $\alpha$, erroneous retransmission of a packet can be suppressed.

5-6. Sixth Example

In a situation where the packet transmission interval $\Delta$ is very large, a variable that stores a value of $\Delta$ may be short in a bit width and thus the fast retransmission determination period T may take an incorrect value. Moreover, in a situation where the number of samples is still small in the foregoing fourth example, calculation accuracy of the average value RTTave of RTTs remains low. In this manner, there may be inappropriate situations for the fast retransmission control processing. For this reason, in a sixth example, the fast retransmission control processing (Step S200) is performed only in a case where a specified condition is met.

Figure 18:
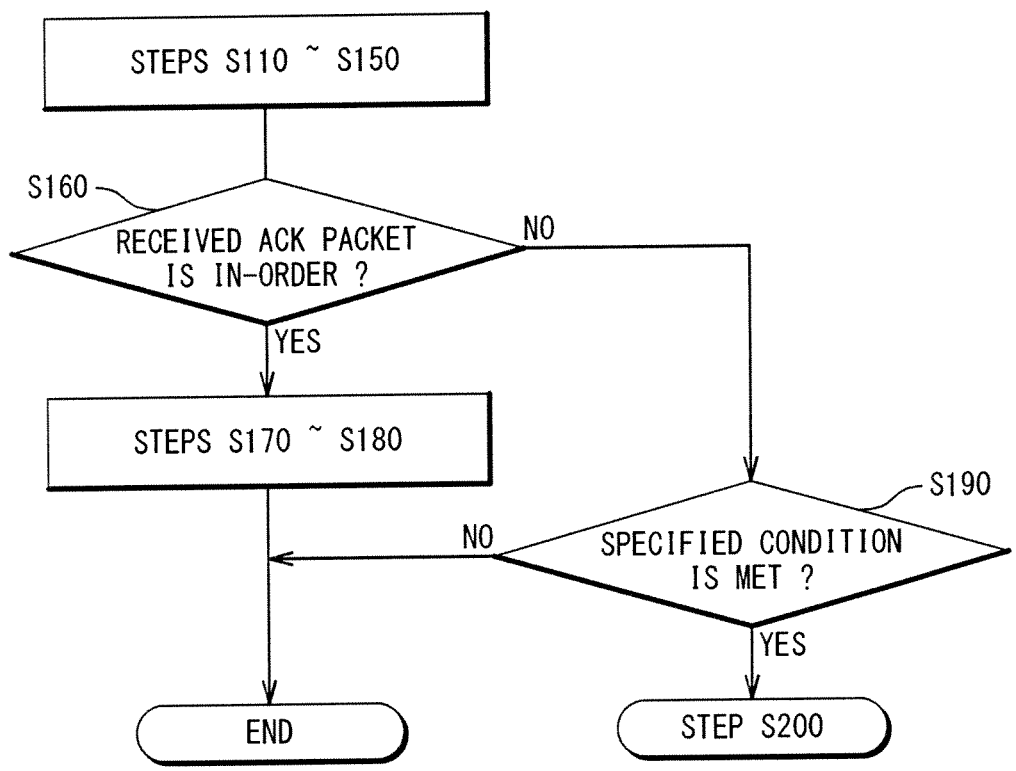
FIG. 18 is a flow chart showing a sixth example of the ACK packet reception processing in the exemplary embodiment of the present invention.

FIG. 18 is a flow chart showing the sixth example of Step S100. As compared with the flow shown in FIG. 12, Step S190 is added between Steps S160 and S200. The other processing is the same as in the case of the first example, and an overlapping description will be omitted as appropriate.

Step S190:

The lower layer retransmission control unit 30 determines whether or not the specified condition is met. If the specified condition is met (Step S190; Yes), Step S200 is performed. On the other hand, if the specified condition is not met (Step S190; No), Step S200 is not performed, and the processing is terminated.

As the specified condition, the following examples are possible.

(Condition 1) The data transmission rate measured by the data transmission unit 311 exceeds a predetermined threshold value TH_FR_RATE: In other words, Step S200 is not performed in a situation where the packet transmission interval $\Delta$ is very large.

(Condition 2) The packet transmission interval $\Delta$ falls below a predetermined threshold value TH_FR_DELTA: In other words, Step S200 is not performed in a situation where the packet transmission interval $\Delta$ is very large.

(Condition 3) The number of ACK packets received exceeds a specified value TH_FR_ACK: If the number of ACK packets received exceeds the specified value TH_FR_ACK, a value of the average value RTTave also becomes appropriate According to the sixth example, the same effects as in the first example can be obtained. Furthermore, the fast retransmission control processing is carried out only in an appropriate situation. As a result, accuracy and reliability of the fast retransmission control processing are improved.

It should be noted that two or more of the above-described first to sixth examples can be combined as long as no contradiction arises.

6. Other Configuration Examples

FIG. 19 shows a modification example of the transceiving device 1 according to the present exemplary embodiment. In the present modification example, the lower layer retransmission control unit 30 is incorporated in the Program processing device 10. The lower layer retransmission control unit 30 is achieved by the CPU of the program processing device 10 executing a packet retransmission control program PROG. The packet retransmission control program PROG is a computer program executed by the program processing device 10. The packet retransmission control program PROG may be recorded on a computer-readable recording medium. The memory unit 40 is achieved by a RAM or the like that can be accessed by the program processing device 10. Processing in the present modification example is the same as that in the foregoing exemplary embodiment.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A packet retransmission control system comprising:

a network protocol stack that performs packet retransmission control; and a lower layer retransmission control means configured to perform packet retransmission control in a lower layer than said network protocol stack, wherein:

said lower layer retransmission control means, when transmitting a transmission packet, gives a sequence number indicating a transmission order to said transmission packet;

said lower layer retransmission control means receives, from a receiving device receiving said transmission packet as a reception packet, an ACK packet indicating said sequence number of said reception packet;

said lower layer retransmission control means refers to said sequence number of said received ACK packet to determine whether or not said lower layer retransmission control means receives said ACK packet in an order of said sequence number;

said ACK packet responding to a first transmission packet is a first. ACK packet;

said ACK packet responding to a second transmission packet that is transmitted following said first transmission packet is a second ACK packet;

said ACK packet responding to a third transmission packet that is transmitted after said second transmission packet is a third ACK packet;

if said lower layer retransmission control means receives said first ACK packet and receives said third ACK packet following said first ACK packet without receiving said second ACK packet, said lower layer retransmission control means performs fast retransmission control processing;

in said fast retransmission control processing, said lower layer retransmission control means determines whether or not to receive said second ACK packet before a fast retransmission determination period passes after a reception time of said third ACK packet; and if said lower layer retransmission control means fails to receive said second ACK packet within said fast retransmission determination period, said lower layer retransmission control means retransmits said second transmission packet.

(Supplementary Note 2)

The packet retransmission control system according to Supplementary note 1, further comprising a memory device in which transmission packet information is stored, wherein:

said transmission packet information indicates said sequence number and a transmission time with respect to each of said transmission packet;

said lower layer retransmission control means, when receiving said ACK packet, refers to said transmission packet information to obtain said transmission time of said transmission packet having the same sequence number as that of said received ACK packet;

said lower layer retransmission control means calculates an RTT (Round Trip Time) regarding said received ACK packet, based on said obtained transmission time and a reception time of said received ACK packet; and said fast retransmission determination period depends on said RTT.

(Supplementary Note 3)

The packet retransmission control system according to Supplementary note 2, wherein:

a range of said RTT is defined as from RTTmin to RTTmax;

said lower layer retransmission control means refers to said transmission packet information to calculate a difference Δ in said transmission time between said second transmission packet and said third transmission packet; and said lower layer retransmission control means sets said fast retransmission determination period to RTTmax−RTTmin−Δ.

(Supplementary Note 4)

The packet retransmission control system according to Supplementary note 3, wherein:

if said calculated RTT is more than said RTTmax, said lower layer retransmission control means updates said RTTmax to said calculated RTT; and if said calculated RTT is less than said RTTmin, said lower layer retransmission control means updates said RTTmin to said calculated RTT.

(Supplementary Note 5)

The packet retransmission control system according to Supplementary note 3, wherein:

said lower layer retransmission control means compares said calculated RTT with a predetermined threshold value;

if said calculated RTT is more than said predetermined threshold value, said lower layer retransmission control means releases said transmission packet having the same sequence number as that of said received ACK packet without updating said RTTmax nor said RTTmin;

if said calculated RTT is equal to or less than said predetermined threshold value and more than said RTTmax, said lower layer retransmission control means updates said RTTmax to said calculated RTT; and if said calculated RTT is less than said RTTmin, said lower layer retransmission control means updates said RTTmin to said calculated RTT.

(Supplementary Note 6)

The packet retransmission control system according to Supplementary note 3, wherein:

said lower layer retransmission control means calculates an average value of said RTT with respect to each source of said received ACK packet;

if said calculated average value is more than said RTTmax, said lower layer retransmission control means updates said RTTmax to said calculated average value; and if said calculated average value is less than said RTTmin, said lower layer retransmission control means updates said RTTmin to said calculated average value.

(Supplementary Note 7)

The packet retransmission control system according to any one of Supplementary notes 3 to 6, wherein if a specified condition is met, said lower layer retransmission control means resets said RTTmax and said RTTmin.

(Supplementary Note 8)

The packet retransmission control system according to any one of Supplementary notes 1 to 7, comprising:

a transmitting device; and said receiving device, wherein:

each of said transmitting device and said receiving device comprises said network protocol stack and said lower layer retransmission control means;

said lower layer retransmission control means of said transmitting device transmits said transmission packet to said receiving device; and said lower layer retransmission control means of said receiving device sends said ACK packet back to said transmitting device.

(Supplementary Note 9)

A packet retransmission control method comprising: performing packet retransmission control by a network protocol stack; and performing packet retransmission control in a lower layer than said network protocol stack, wherein said performing packet retransmission control in said lower layer comprises:

giving, when transmitting a transmission packet, a sequence number indicating a transmission order to said transmission packet; and receiving, from a receiving device receiving said transmission packet as a reception packet, an ACK packet indicating said sequence number of said reception packet, wherein said ACK packet responding to a first transmission packet is a first ACK packet, said ACK packet responding to a second transmission packet that is transmitted following said first transmission packet is a second ACK packet, and said ACK packet responding to a third transmission packet that is transmitted after said second transmission packet is a third ACK packet, wherein said performing packet retransmission control in said lower layer further comprises:

referring to said sequence number of said received ACK packet to determine whether or not to said ACK packet is received in an order of said sequence number; and performing fast retransmission control processing, if receiving said first ACK packet and receiving said third ACK packet following said first ACK packet without receiving said second ACK packet, wherein said fast retransmission control processing comprises:

determining whether or not to receive said second ACK packet before a fast retransmission determination period passes after a reception time of said third ACK packet; and retransmitting said second transmission packet, if failing to receive said second ACK packet within said fast retransmission determination period.

(Supplementary Note 10)

A packet retransmission control program which causes a computer to perform packet retransmission control processing, wherein said packet retransmission control processing comprises performing packet retransmission control in a lower layer than a network protocol stack that performs packet retransmission control, wherein said performing packet retransmission control in said lower layer comprises:

giving, when transmitting a transmission packet, a sequence number indicating a transmission order to said transmission packet; and receiving, from a receiving device receiving said transmission packet as a reception packet, an ACK packet indicating said sequence number of said reception packet, wherein said ACK packet responding to a first transmission packet is a first ACK packet, said ACK packet responding to a second transmission packet that is transmitted following said first transmission packet is a second ACK packet, and said ACK packet responding to a third transmission packet that is transmitted after said second transmission packet is a third ACK packet, wherein said performing packet retransmission control in said lower layer further comprises:

referring to said sequence number of said received ACK packet to determine whether or not to said ACK packet is received in an order of said sequence number; and performing fast retransmission control processing, if receiving said first ACK packet and receiving said third ACK packet following said first ACK packet without receiving said second ACK packet, wherein said fast retransmission control processing comprises:

determining whether or not to receive said second ACK packet before a fast retransmission determination period passes after a reception time of said third ACK packet; and retransmitting said second transmission packet, if failing to receive said second ACK packet within said fast retransmission determination period.

This application is based upon and claims the benefit of priority from Japanese patent application No. 2010-046418, filed on Mar. 3, 2010, the disclosure of which is incorporated herein in its entirely by reference.

The invention claimed is:

1. A packet retransmission control system comprising:
a network protocol stack that performs packet retransmission control;
a lower layer retransmission control unit configured to perform packet retransmission control in a lower layer than said network protocol stack; and
a memory device in which transmission packet information is stored,
wherein:
said lower layer retransmission control unit, when transmitting a transmission packet, gives a sequence number indicating a transmission order to said transmission packet;
said lower layer retransmission control unit receives, from a receiving device receiving said transmission packet as a reception packet, an ACK packet indicating said sequence number of said reception packet;
said lower layer retransmission control unit refers to said sequence number of said received ACK packet to determine whether said lower layer retransmission control unit receives said ACK packet in an order of said sequence number;
said ACK packet responding to a first transmission packet is a first ACK packet;
said ACK packet responding to a second transmission packet that is transmitted following said first transmission packet is a second ACK packet;
said ACK packet responding to a third transmission packet that is transmitted after said second transmission packet is a third ACK packet;
if said lower layer retransmission control unit receives said first ACK packet and receives said third ACK packet following said first ACK packet without receiving said second ACK packet, said lower layer retransmission control unit performs fast retransmission control processing;
in said fast retransmission control processing, said lower layer retransmission control unit determines whether to receive said second ACK packet before a fast retransmission determination period passes after a reception time of said third ACK packet;
if said lower layer retransmission control unit fails to receive said second ACK packet within said fast retransmission determination period, said lower layer retransmission control unit retransmits said second transmission packet;
said transmission packet information indicates said sequence number and a transmission time with respect to each of said transmission packet;
said lower layer retransmission control unit, when receiving said ACK packet, refers to said transmission packet information to obtain said transmission time of said transmission packet having a same sequence number as that of said received ACK packet;
said lower layer retransmission control unit calculates an RTT (Round Trip Time) regarding said received ACK packet, based on said obtained transmission time and a reception time of said received ACK packet;
said fast retransmission determination period depends on said RTT;
a range of said RTT is defined as from RTTmin to RTTmax;
said lower layer retransmission control unit refers to said transmission packet information to calculate a difference $\Delta$ in said transmission time between said second transmission packet and said third transmission packet; and
said lower layer retransmission control unit sets said fast retransmission determination period to RTTmax−RTTmin−$\Delta$;

if said calculated RTT is greater than said RTTmax, said lower layer retransmission control unit updates said RTTmax to said calculated RTT; and if said calculated RTT is less than said RTTmin, said lower layer retransmission control unit updates said RTTmin to said calculated RTT.

2. The packet retransmission control system according to claim 1,
wherein if a specified condition is met, said lower layer retransmission control unit resets said RTTmax and said RTTmin.

3. The packet retransmission control system according to claim 1, further comprising:
a transmitting device; and
said receiving device, wherein:
each of said transmitting device and said receiving device comprises said network protocol stack and said lower layer retransmission control unit;
said lower layer retransmission control unit of said transmitting device transmits said transmission packet to said receiving device; and
said lower layer retransmission control unit of said receiving device sends said ACK packet back to said transmitting device.

4. A packet retransmission control system comprising:
a network protocol stack that performs packet retransmission control;
a lower layer retransmission control unit configured to perform packet retransmission control in a lower layer than said network protocol stack; and
a memory device in which transmission packet information is stored,
wherein:
said lower layer retransmission control unit, when transmitting a transmission packet, gives a sequence number indicating a transmission order to said transmission packet;
said lower layer retransmission control unit receives, from a receiving device receiving said transmission packet as a reception packet, an ACK packet indicating said sequence number of said reception packet;
said lower layer retransmission control unit refers to said sequence number of said received ACK packet to determine whether said lower layer retransmission control unit receives said ACK packet in an order of said sequence number;
said ACK packet responding to a first transmission packet is a first ACK packet;
said ACK packet responding to a second transmission packet that is transmitted following said first transmission packet is a second ACK packet;
said ACK packet responding to a third transmission packet that is transmitted after said second transmission packet is a third ACK packet;
if said lower layer retransmission control unit receives said first ACK packet and receives said third ACK packet following said first ACK packet without receiving said second ACK packet, said lower layer retransmission control unit performs fast retransmission control processing;
in said fast retransmission control processing, said lower layer retransmission control unit determines whether to receive said second ACK packet before a fast retransmission determination period passes after a reception time of said third ACK packet;
if said lower layer retransmission control unit fails to receive said second ACK packet within said fast retransmission determination period, said lower layer retransmission control unit retransmits said second transmission packet;
said transmission packet information indicates said sequence number and a transmission time with respect to each of said transmission packet,
said lower layer retransmission control unit, when receiving said ACK packet, refers to said transmission packet information to obtain said transmission time of said transmission packet having a same sequence number as that of said received ACK packet;
said lower layer retransmission control unit calculates an RTT (Round Trip Time) regarding said received ACK packet, based on said obtained transmission time and a reception time of said received ACK packet;
said fast retransmission determination period depends on said RTT;
a range of said RTT is defined as from RTTmin to RTTmax;
said lower layer retransmission control unit refers to said transmission packet information to calculate a difference Δ in said transmission time between said second transmission packet and said third transmission packet; and
said lower layer retransmission control unit sets said fast retransmission determination period to RTTmax−RTTmin−Δ;
said lower layer retransmission control unit compares said calculated RTT with a predetermined threshold value;
if said calculated RTT is greater than said predetermined threshold value, said lower layer retransmission control unit releases said transmission packet having the same sequence number as that of said received ACK packet without updating said RTTmax nor said RTTmin;
if said calculated RTT is equal to or less than said predetermined threshold value and more than said RTTmax, said lower layer retransmission control unit updates said RTTmax to said calculated RTT; and
if said calculated RTT is less than said RTTmin, said lower layer retransmission control unit updates said RTTmin to said calculated RTT.

5. A packet retransmission control system comprising:
a network protocol stack that performs packet retransmission control;
a lower layer retransmission control unit configured to perform packet retransmission control in a lower layer than said network protocol stack; and
a memory device in which transmission packet information is stored,
wherein:
said lower layer retransmission control unit, when transmitting a transmission packet, gives a sequence number indicating a transmission order to said transmission packet;
said lower layer retransmission control unit receives, from a receiving device receiving said transmission packet as a reception packet, an ACK packet indicating said sequence number of said reception packet;
said lower layer retransmission control unit refers to said sequence number of said received ACK packet to determine whether said lower layer retransmission control unit receives said ACK packet in an order of said sequence number;
said ACK packet responding to a first transmission packet is a first ACK packet;
said ACK packet responding to a second transmission packet that is transmitted following said first transmission packet is a second ACK packet;

said ACK packet responding to a third transmission packet that is transmitted after said second transmission packet is a third ACK packet;

if said lower layer retransmission control unit receives said first ACK packet and receives said third ACK packet following said first ACK packet without receiving said second ACK packet, said lower layer retransmission control unit performs fast retransmission control processing;

in said fast retransmission control processing, said lower layer retransmission control unit determines whether to receive said second ACK packet before a fast retransmission determination period passes after a reception time of said third ACK packet;

if said lower layer retransmission control unit fails to receive said second ACK packet within said fast retransmission determination period, said lower layer retransmission control unit retransmits said second transmission packet;

said transmission packet information indicates said sequence number and a transmission time with respect to each of said transmission packet, said lower layer retransmission control unit, when receiving said ACK packet, refers to said transmission packet information to obtain said transmission time of said transmission packet having a same sequence number as that of said received ACK packet;

said lower layer retransmission control unit calculates an RTT (Round Trip Time) regarding said received ACK packet, based on said obtained transmission time and a reception time of said received ACK packet;

said fast retransmission determination period depends on said RTT;

a range of said RTT is defined as from RTTmin to RTTmax;

said lower layer retransmission control unit refers to said transmission packet information to calculate a difference $\Delta$ in said transmission time between said second transmission packet and said third transmission packet; and said lower layer retransmission control unit sets said fast retransmission determination period to RTTmax−RTTmin−$\Delta$;

said lower layer retransmission control unit calculates an average value of said RTT with respect to each source of said received ACK packet;

if said calculated average value is greater than said RTTmax, said lower layer retransmission control unit updates said RTTmax to said calculated average value; and if said calculated average value is less than said RTTmin, said lower layer retransmission control unit updates said RTTmin to said calculated average value.

6. A packet retransmission control method comprising:
performing packet retransmission control by a network protocol stack;
performing packet retransmission control in a lower layer than said network protocol stack; and
storing transmission packet information in a memory device,
wherein said performing packet retransmission control in said lower layer comprises:
giving, when transmitting a transmission packet, a sequence number indicating a transmission order to said transmission packet; and
receiving, from a receiving device receiving said transmission packet as a reception packet, an ACK packet indicating said sequence number of said reception packet,
wherein said ACK packet responding to a first transmission packet comprises a first ACK packet,
said ACK packet responding to a second transmission packet that is transmitted following said first transmission packet comprises a second ACK packet, and
said ACK packet responding to a third transmission packet that is transmitted after said second transmission packet comprises a third ACK packet,
wherein said performing packet retransmission control in said lower layer further comprises:
referring to said sequence number of said received ACK packet to determine whether said ACK packet is received in an order of said sequence number; and
performing fast retransmission control processing, if receiving said first ACK packet and receiving said third ACK packet following said first ACK packet without receiving said second ACK packet,
wherein said fast retransmission control processing comprises:
determining whether to receive said second ACK packet before a fast retransmission determination period passes after a reception time of said third ACK packet; and
retransmitting said second transmission packet, if failing to receive said second ACK packet within said fast retransmission determination period, and
wherein:
said transmission packet information indicates said sequence number and a transmission time with respect to each of said transmission packet;
said lower layer retransmission control unit, when receiving said ACK packet, refers to said transmission packet information to obtain said transmission time of said transmission packet having a same sequence number as that of said received ACK packet;
said lower layer retransmission control unit calculates an RTT (Round Trip Time) regarding said received ACK packet, based on said obtained transmission time and a reception time of said received ACK packet;
said fast retransmission determination period depends on said RTT;
a range of said RTT is defined as from RTTmin to RTTmax;
said lower layer retransmission control unit refers to said transmission packet information to calculate a difference $\Delta$ in said transmission time between said second transmission packet and said third transmission packet;
said lower layer retransmission control unit sets said fast retransmission determination period to RTTmax−RTTmin−$\Delta$;
if said calculated RTT is greater than said RTTmax, said lower layer retransmission control unit updates said RTTmax to said calculated RTT; and
if said calculated RTT is less than said RTTmin, said lower layer retransmission control unit updates said RTTmin to said calculated RTT.

7. A packet retransmission control program recorded on a non-transitory tangible computer-readable medium that, when executed, causes a computer to a perform packet retransmission control processing,
wherein said packet retransmission control processing comprises performing packet retransmission control in a lower layer than a network protocol stack that performs packet retransmission control and storing transmission packet information in a memory device,
wherein said performing packet retransmission control in said lower layer comprises:

giving, when transmitting a transmission packet, a sequence number indicating a transmission order to said transmission packet; and receiving, from a receiving device receiving said transmission packet as a reception packet, an ACK packet indicating said sequence number of said reception packet, wherein said ACK packet responding to a first transmission packet comprises a first ACK packet, said ACK packet responding to a second transmission packet that is transmitted following said first transmission packet comprises a second ACK packet, and said ACK packet responding to a third transmission packet that is transmitted after said second transmission packet comprises a third ACK packet, wherein said performing packet retransmission control in said lower layer further comprises:

referring to said sequence number of said received ACK packet to determine whether said ACK packet is received in an order of said sequence number; and performing fast retransmission control processing, if receiving said first ACK packet and receiving said third ACK packet following said first ACK packet without receiving said second ACK packet, wherein said fast retransmission control processing comprises:

determining whether to receive said second ACK packet before a fast retransmission determination period passes after a reception time of said third ACK packet; and retransmitting said second transmission packet, if failing to receive said second ACK packet within said fast retransmission determination period, and wherein:

said transmission packet information indicates said sequence number and a transmission time with respect to each of said transmission packet;

said lower layer retransmission control unit, when receiving said ACK packet, refers to said transmission packet information to obtain said transmission time of said transmission packet having a same sequence number as that of said received ACK packet;

said lower layer retransmission control unit calculates an RTT (Round Trip Time) regarding said received ACK packet, based on said obtained transmission time and a reception time of said received ACK packet;

said fast retransmission determination period depends on said RTT;

a range of said RTT is defined as from RTTmin to RTTmax;

said lower layer retransmission control unit refers to said transmission packet information to calculate a difference $\Delta$ in said transmission time between said second transmission packet and said third transmission packet;

said lower layer retransmission control unit sets said fast retransmission determination period to RTTmax−RTTmin−$\Delta$;

if said calculated RTT is greater than said RTTmax, said lower layer retransmission control unit updates said RTTmax to said calculated RTT; and if said calculated RTT is less than said RTTmin, said lower layer retransmission control unit updates said RTTmin to said calculated RTT.

\* \* \* \* \*